(12) United States Patent
Koga et al.

(10) Patent No.: US 7,792,155 B2
(45) Date of Patent: Sep. 7, 2010

(54) COMMUNICATION SYSTEM AND SLAVE AND REPEATER UNITS THEREFOR

(75) Inventors: Masao Koga, Kusatsu (JP); Masanori Fujikawa, Ootsu (JP); Toshiyuki Ozaki, Ritto (JP)

(73) Assignee: OMRON Corporation, Kyoto (JP)

( * ) Notice: Subject to any disclaimer, the term of this patent is extended or adjusted under 35 U.S.C. 154(b) by 833 days.

(21) Appl. No.: 11/513,640

(22) Filed: Aug. 30, 2006

(65) Prior Publication Data

US 2007/0047588 A1 Mar. 1, 2007

(30) Foreign Application Priority Data

Aug. 31, 2005 (JP) ............................. 2005-252423

(51) Int. Cl.
*H04J 3/08* (2006.01)
(52) U.S. Cl. ...................... 370/508; 370/501; 370/432; 370/401; 370/389
(58) Field of Classification Search ................. 370/257, 370/389, 390, 392, 395.1, 395.31, 395.4, 370/395.7, 401, 402, 408, 410, 414, 443
See application file for complete search history.

(56) References Cited

U.S. PATENT DOCUMENTS

| | | | | |
|---|---|---|---|---|
| 4,943,932 A | * | 7/1990 | Lark et al. | 706/60 |
| 6,631,410 B1 | * | 10/2003 | Kowalski et al. | 709/224 |
| 6,778,987 B1 | * | 8/2004 | Wynblatt et al. | 707/10 |
| 6,785,272 B1 | | 8/2004 | Sugihara | |

| | | | |
|---|---|---|---|
| 2004/0225814 A1 | 11/2004 | Ervin | |
| 2005/0030961 A1 | 2/2005 | Lee et al. | |
| 2005/0136835 A1 | 6/2005 | Suwa | |

FOREIGN PATENT DOCUMENTS

CA 2137587 3/1999

(Continued)

OTHER PUBLICATIONS

Ferreira et al., Hybrid Wired/Wireless PROFIBUS Networks Supported by Bridges/Routers, 4th IEEE International Workshop on Factory Communication Systems, Aug. 28-30, 2002.*

(Continued)

*Primary Examiner*—Jason E Mattis
*Assistant Examiner*—Joey Bednash
(74) *Attorney, Agent, or Firm*—Weaver Austin Villeneuve & Sampson LLP

(57) ABSTRACT

A communication system is formed with a master unit having a communication function and at least one slave unit also having a communication function connected by a network including a bus. Repeater units are inserted on the network between the master unit and the slave unit in one or more stages. As the master unit transmits request frames downstream through the network to the slave unit, the slave unit control the timing of transmitting the response frames in response successively such that the master unit receives the response frames without waiting in between regardless of repeater delay times of each of the returned response frames determined by the number of stages of the repeater units. Each communication frame that is transmitted through the network contains identification data indicative of its type and each repeater unit serves to repeat certain types of received frames only in the upstream direction.

19 Claims, 19 Drawing Sheets

FOREIGN PATENT DOCUMENTS

| EP | 1267233 | 12/2002 |
|---|---|---|
| JP | 04-044434 | 2/1992 |
| JP | 05-091073 | 4/1993 |
| JP | 06-284127 | 10/1994 |
| JP | 2001-102988 | 4/2001 |
| JP | 2003-503899 | 1/2003 |
| JP | 2004-280304 | 7/2004 |
| WO | 2005/046138 | 5/2005 |

OTHER PUBLICATIONS

Braden et al. RFC 2205—Resource ReSerVation Protocol (RSVP), Sep. 1997, Internet Engineering Task Force vol. 1, pp. 4-7, 20 38.*
Wroclawski, RFC 2210—The Use of RSVP with IETF Integrated Services, Sep. 1997, Internet Engineering Task Force, pp. 17-18.*
Shenker and Wroclawski, RFC 2215—General Characterization Parameters, Sep. 1997, Internet Engineering task Force, p. 8.*
PROFIBUS Technology and Application System Description, Oct. 2002, PROFIBUS, pp. 11-14.*
Ferreira, et al., *Hybrid wired/wireless PROFIBUS networks supported by bridges/routers*, IEEE Factory Communication Systems, Aug. 2002, pp. 193-202.
Lutz, et al., *System and device architecture of a radio based fieldbus—The RFieldbus System*, IEEE Factory Communication Systems, Aug. 2002, pp. 185-192.
European patent application No. 06017829.0-2206, European Search Report dated Dec. 11, 2006.
Ferreira et al., "Hybrid Wired/Wireless PROFIBUS Networks Supported by Bridges/Routers", 4th IEEE International Workshop on Factory Communication Systems, Aug. 28-30, 2002, pp. 193-202.
JP patent application No. 2007-167281, Examination Report dated May 14, 2008.
Patent Abstracts of Japan, Publication No. 2004-280304, *Field Bus System, Communication Method And Master/Slave,* Mizutani Seiji, published Oct. 7, 2004, filed Mar. 13, 2003.
Japan patent application No. 2007-167281, Examination Report dated Feb. 6, 2008.
Mogi Shinji et al., "Method of Collecting Topology Data for Sensor Network", article submitted to the 67th National Convention of Information Processing Society of Japan (IPSJ), Mar. 2, 2005, pp. 3.285-3.286.
European patent application No. 06017829.0-2206, Extended European Search Report mailed Feb. 6, 2007.
IEEE Computer Society, *Part 15.3: Wireless Medium Access Control (MAC) and Physical Layer (PHY) Specifications for High Rate Wireless Personal Area Networks (WPANS)*, IEEE Std 802.15.3 ™—2003, XP-002329981, Sep. 29, 2003, pp. 8-220.
Japan patent application No. 2006-233037, Examination Report mailed Apr. 27, 2007.

* cited by examiner

COMMUNICATION SYSTEM AND SLAVE AND REPEATER UNITS THEREFOR

This application claims priority on Japanese Patent Application 2005-252423 filed Aug. 31, 2005.

BACKGROUND OF THE INVENTION

This invention relates to a communication system for a network including a bus for controlling a factory automation apparatus or the like, comprising a master unit for controlling the network, slaves for connecting I/O devices and repeaters for shaping and amplifying a communication frame.

Remote I/O networks of a programmable controller (PLC) comprising a single master and a plurality of slaves and repeaters are already known. FIG. 17 shows an example of such a network, or a network system comprised of a single master unit 70, slave units 80a-80d (or slaves #1-#4) and repeater units 90a-90d (or repeaters #1-#4) wherein the repeaters are formed in two stages.

In the above, the PLC is formed as a combination of units such as a control unit (CPU unit 20) for carrying out a user program, an input-output unit (an I/O unit) connecting input devices and output devices (together referred to as I/O devices) and a communication master unit connecting to a remote I/O network for communicating input-output data (I/O data) with the slave units. The master unit 70 may be understood as corresponding to a set of programmable controllers or to the communication master unit 10 of the PLC. This network is formed as a network including a bus and the master unit is for controlling this network, being incorporated in the programmable controller. The slave units are connected to the I/O devices (not shown) and serve to control the output devices based on output data stored in a communication frame received from the master unit and to return to the master unit input data taken in from input devices by storing in a communication frame in response to a request from the master unit. The repeater units are for carrying out waveform shaping and amplification processes on communication frames that are transmitted and received on the network. Thus, whenever a request frame from the master unit to each of the slave units or a response frame from each of the slave units to the master unit is communicated and passes through a repeater unit, shaping and amplification processes are carried out and hence a delay of a specified length (a repeater delay) required for such processes is experienced. FIG. 21 is an operation flow of request frames transmitted from the master unit and response frames from the slave units at observation points A, B, C and D shown in FIG. 17 as a time sequence.

As shown in FIG. 17, Slave #1 is directly connected to the master unit without any repeater unit in between. For this reason, the response from slave unit 80a at Observation Point A has no repeater delay, and the response frame from Slave #1 is transmitted as soon as the trigger frame from the master unit is completed. By contrast, there is a repeater unit between Slave #2 and the master unit and there are two repeater units each between Slaves #3 and #4 and the master unit. Thus, a repeater delay is generated whenever a trigger frame transmitted to Slave #2, #3 or #4 passes through a repeater unit. A repeater delay is also generated when a response frame from these slave units passes through a repeater unit. For this reason, as disclosed in Japanese Patent Publication Tokkai 2004-280304, time gaps used to be provided between responses from the slaves by taking into consideration the repeater delays generated at the repeater units such that collisions between responses can be avoided.

At Observation Points B, C and D, too, response frames are similarly transmitted with time gaps appropriately provided as shown in FIG. 21 in view of these repeater delays that will be generated.

Since the system shown in FIG. 17 is a bus-type system, furthermore, each repeater unit is adapted to repeat all communication frames including both those flowing in the downstream direction and those flowing in the upstream direction. With a system structure as shown in FIG. 17, each response frame from Slave #3 passes through four repeater units (units 90d, 90c, 90a and 90b) to reach the master unit and the other slave units. The time required to reach Slave #4 will be four times the repeater delay. In order to avoid collisions of response frames from all of the slave units, therefore, the average time interval at Observation Point A must be four times the repeater delay. Thus, the communication cycle becomes equal to (the trigger frame time)+{(response frame time)+(repeater delay)×(maximum number of repeater stages)×2}×(number of slaves).

As explained, furthermore, prior art repeater units are adapted to repeat all communication frames including both those flowing downstream and those flowing upstream. Explained more in detail with reference to FIG. 21, response frames from Slave #1, for example, are transmitted not only to the master unit but also through the repeater units to the other slaves such as Slaves #2, #3 and #4. This is clear since the response frames from Slave #1 are observed at all Observation Points A, B, C and D. Similarly, response frames from all slave units are observed at all Observation Points A, B, C and D.

According to prior art methods, since responses are prevented from colliding by considering the repeater delay that takes places at each repeater unit to provide time intervals between responses from each slave unit. This gives rise to the problem of increased communication cycle by the length of the response intervals at each slave unit. Moreover, the occupation rate of the communication route is increased because the communication frames transmitted from each of the slave units on the network are repeated to the other slave units. This has the undesirable result of adversely affecting the communication capability.

SUMMARY OF THE INVENTION

It is therefore an object of this invention in view of the above to provide a method of reducing the effects of repeater delay by which collisions of responses from the slave units can be prevented without increasing the communication cycle.

It is another object of this invention to provide a system for carrying out such a method.

It is a further object of this invention to provide a repeater unit on a network adapted to determine the kind of communication frame to be repeated and to repeat only necessary data such that the occupation ratio of the network on the downstream side can be reduced and the network efficiency can be improved.

Additional objects and aspects of this invention will become evident to a person skilled in the art from the descriptions in the specification that follow.

A communication system according to this invention may be characterized as comprising a master unit which is a programmable controller having a communication function, at least one slave unit which is an I/O terminal unit having a communication function and connected to the master unit by a network, and repeater units inserted on the network between the master unit and the aforementioned at least one slave unit in one or more stages. The master unit serves to transmit request frames in a downstream direction through the network to the aforementioned at least one slave unit, response frames being transmitted from the aforementioned at least one slave unit each in response to a corresponding one of the request frames. The repeater units serve to repeat the response frames only in an upstream direction through the network which is opposite the downstream direction. Communication frames of various types that include both the aforementioned request and response frames each contain identification data indicative of the type thereof.

With a communication system thus structured, each response frame transmitted from a slave unit to the master unit is not transmitted to a different slave unit, unlike inside a prior art communication system. In other words, unwanted transmissions are not carried out and hence the intervals between the response timings from each slave units set in order to prevent collisions among the responses on the network can be minimized.

According to an embodiment of this invention, the master unit serves to read out from received one of the response frames the number of stages of repeater units passed by it, to calculate a time domain for setting a timing for returning the response frames from the slave unit to the master unit based on the number of stages that has been read out, and to write the time domain in one of the request frames.

With a communication system thus structured, the data obtainable from a transmitted communication frame can be used to learn the position on the network of the slave which transmitted that frame such as the number of stages of the repeater units on the route from the master unit to that slave unit. The time domain that is calculated by the master unit can be used to set the response timing of each slave unit such that the waiting periods between the transmission of responses from the slave unit can be reduced and a high-speed communication cycle can be realized.

According to a further embodiment of the invention, the time domain is set for each slave unit such that the master unit receives the returned response frames without waiting in between regardless of repeater delay times of each of the returned response frames determined by the number of the stages of the repeater units.

In the above, the repeater delay time means the delay time length which is taken by a communication frame being transmitted on the network as it passes through a repeater unit. Since various processes such as waveform shaping and amplification are carried out by a repeater unit on each frame which is repeated thereby, a delay results wherever the frame is repeated, compared to the situation where there is no repeater unit. According to this invention, such repeater delays caused by the repeaters and the waiting periods between responses can be reduced.

In the above, the request frames are preferably adapted to contain data on address values of the repeater units that have been passed and data on the number of stages of the repeater units, the repeater unit serving to store data on the address value of the repeater unit and the value of one plus the number of stages of the repeater units when one of the request frames passes through the repeater unit, and the slave unit serving to read out of the request frame data on the address value of the repeater unit adjoining in the upstream direction and on the number of repeater units and to cause the response frame to the master unit to contain data on the address value of the repeater unit adjoining in the upstream direction and the number of stages of the repeater units read out of the request frame.

The communication frames may include a so-called "in frame" for transmitting input data of the I/O terminal unit by the slave unit, the slave unit serving to return the in frame containing the input data of the I/O terminal based on the time domain, and the repeater units repeating the in frame only in the upstream direction.

The slave unit may be adapted to transmit a so-called "connection frame" for acknowledging existence of the slave unit to the master unit, the master unit serving to transmit a request frame for requesting the slave unit to transmit the connection frame, the communication frames including the connection frame and the request frame, and the repeater units repeating the connection frame only in the upstream direction.

A communication system may be characterized as comprising a master unit which is a programmable controller having a communication function, at least one slave unit which is an I/O terminal unit having a communication function and connected to the master unit by a network, and repeater units inserted on the network between the master unit and the at least one slave unit in one or more stages, the network serving to transmit communication frames of various types therethrough, each of the communication frames containing identification data indicative of the type thereof, the repeater units serving to repeat some of the communication frames only in an upstream direction through the network, depending on the type thereof, and the slave unit storing the number of stages of the repeater units between the slave unit and the master unit and transmitting response frames successively in response to request frames received from the master unit such that the master unit receives the response frames without waiting in between regardless of repeater delay times of each of the returned response frames determined by the number of the stages of the repeater units.

With a communication system thus structured, the response frames transmitted from a slave unit to the master unit are transmitted only to the master unit and not transmitted to the other slave unit, unlike in a prior art communication system. Thus, there are no wasteful transmission of frames and the waiting periods provided for avoiding collisions among the responses can be minimized and the effects of repeater delays generated by the repeater units that are passed through can be eliminated.

In the above, the master unit may be adapted to serve to transmit a request frame to the slave unit for requesting transmission of a connection frame for acknowledging existence of the slave unit, the slave unit further serving to transmit the connection frame to the master unit, the aforementioned communication frames of various types including the connection frame and the request frame, and the repeater units repeating the connection frame only in the upstream direction.

The communication frames may include a so-called "in frame" for transmitting input data of the I/O terminal unit by the slave unit, the slave unit serving to return the in frame containing the input data of the I/O terminal such that the master unit receives the response frames without waiting in between regardless of repeater delay times of each of the returned response frames determined by the number of the stages of the repeater units, and the repeater units repeating the in frame only in the upstream direction.

The invention further relates individually to a slave unit and a repeater unit for a communication system that includes a master unit which is a programmable controller having a communication function, at least one slave unit which is an I/O terminal unit having a communication function and connected to the master unit by a network, and repeater units inserted on the network between the master unit and the slave unit in one or more stages. In the above, the slave unit of this invention may be characterized as comprising a reception processing part that serves to read from a communication frame transmitted from the master unit a transmission time of the communication frame and the number of the stages of the repeater units that are passed by the communication frame and a transmission processing part that serves, when it is being requested to transmit a response frame in response to the communication frame from the master unit, to return a response without waiting in between regardless of repeater delay times determined by the number of the stages of the repeater units, and the repeater unit may be characterized as comprising frame receiving means for receiving communication frames of various types containing identification data for identifying the types of the received communication frames and type identifying means for identifying the types of the received communication frames, the repeater unit serving to repeat received communication frames, if the received communication frames are identified to be of a type transmitted from the slave unit to the master unit, only from a downstream direction to an upstream direction on the network.

DETAILED DESCRIPTION OF THE INVENTION

Figure 1:
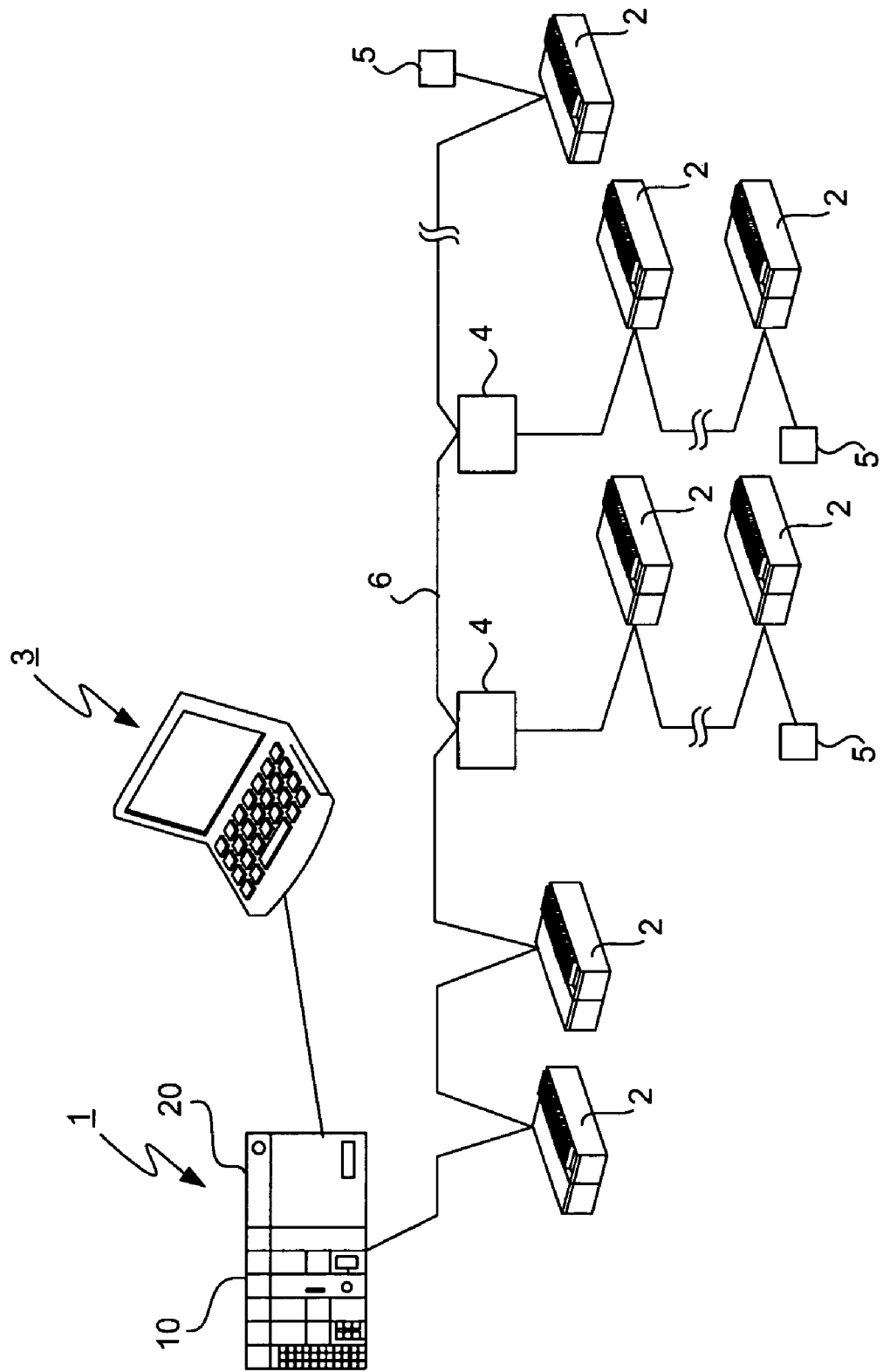
FIG. 1 is a structural diagram of a PLC system including a communication master unit, communication slaves and repeaters.

The invention is described by way of an example with reference to drawings. FIG. 1 is a structural diagram of the whole of a PLC system inclusive of a master unit and communication units. Explained more in detail, FIG. 1 shows a PLC system comprising a PLC device 1 having communication functions as a communication master unit and a plurality of I/O terminal devices 2 having a communication functions as a communication slave unit, connected together by a field bus 6 which is a bus-type network. In FIG. 1, numeral 3 indicates a setting device making use of a personal computer, having the function of carrying out various setting operations on devices and apparatus serving as nodes on the network such as the PLC device 1, the master unit 10, communication slave units and repeaters 4 serving as repeater units. It is sometimes referred to as a setting tool device or a network configurator. Numeral 5 indicates an end device for reducing reflections at the end of the field bus 6.

According to the illustrated example, the PLC device 1 is of the so-called building block type, having many connectors placed on a back plane (not shown) where parallel bus is laid such that advanced units such as CPU unit and I/O unit can be mounted to these connectors. According to this example, in particular, the communication master unit 10 is mounted to one of these connectors so as to form a PLC device with communication functions. In FIG. 1, only the CPU unit 20 and the communication master unit 10 are indicated by a reference numeral.

Figure 2:
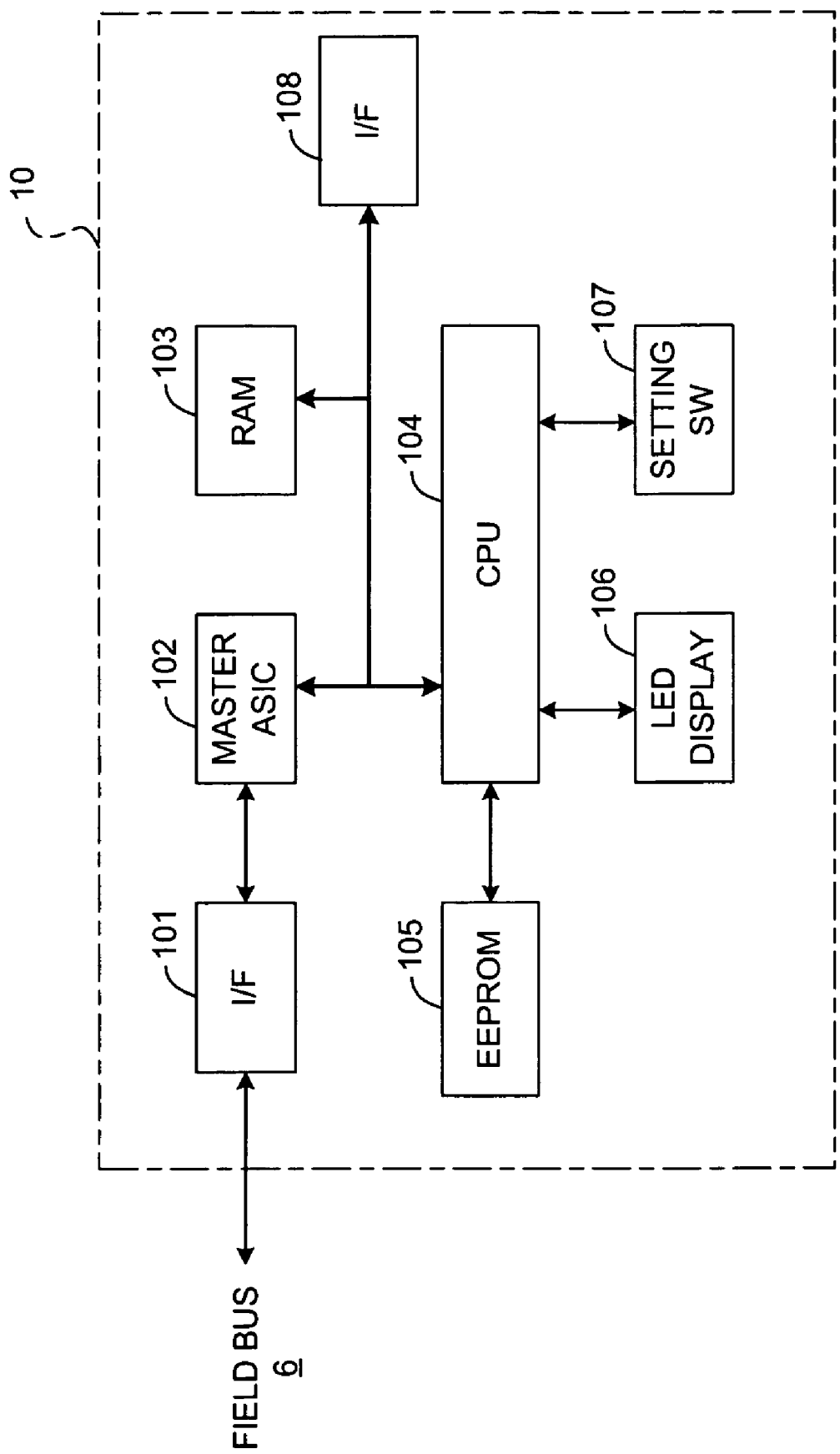
FIG. 2 is a hardware structural diagram of the communication master unit.

FIG. 2 is a hardware structural diagram of the communication master unit 10 to show its internal structure. As shown, it includes a communication interface (I/F) 101 functioning as a physical communication layer, a master ASIC 102 which is a circuit in the form of LSI for realizing desired communication functions, a CPU 104 which has a microprocessor as its main body and serves to control the device as a whole, a RAM 103 which functions as a buffer area for transmission and reception data exchanged with the CPU unit 20 and as a calculation work area for the CPU 104 to be described below, a non-volatile memory (EEPROM) 105 for storing set data of various kinds, an LED display device 106 for making displays of various kinds, a setting switch 107 to be used for various setting operations and an internal bus interface 108 which functions as an interface to an internal bus leading to the CPU unit 20.

As well known by persons skilled in the art, the CPU unit 20 of a PLC system of this kind is adapted to cyclically carry out processes such as the common process, the I/O refresh process, the user program execution process and the peripheral service operations, the I/O refresh process being carried out not only between local I/O units set on the back plane but also between the RAM 103 inside the communication master unit 10.

Explained more specifically, output data in the I/O memory of the CPU unit 20 are written into the OUT area in the RAM 103 of the communication master unit 10 and input data of the RAM 103 are written into the IN area in the I/O memory of the CPU unit 20.

Between the communication master unit 10 and each I/O terminal device 2, as will be explained more in detail below, communications are carried out through the field bus 6 non-synchronously with the I/O refresh operations of the CPU unit 20, and a kind of I/O refresh process is thereby also carried out between each I/O terminal device 2 and the RAM 103 inside the communication master unit 10.

Explained more in detail, input data received from the I/O terminal device 2 are written into the IN area of the RAM 103 in the communication master unit 10, and the CPU unit 20 takes them in from the communication master unit 10 by the I/O refresh operation. The CPU unit 20 carries out the user program on the basis of the input data and the results of this execution become the output data which are transmitted out to the communication master unit by the I/O refresh operation. The communication master unit 10 stores the output data in the OUT area of the RAM 103 and transmits the output data of the OUT area of the RAM 103 to the corresponding I/O terminal device 2 non-synchronously to the I/O refresh.

This is the manner in which the I/O refresh process is carried out between the I/O memory in the CPU unit 20 and each of the I/O terminal devices 2 through the communication master unit 10. As a result, the I/O apparatus connected to remotely set I/O terminal devices 2 come to be controllable by the CPU unit 20.

Figure 3:
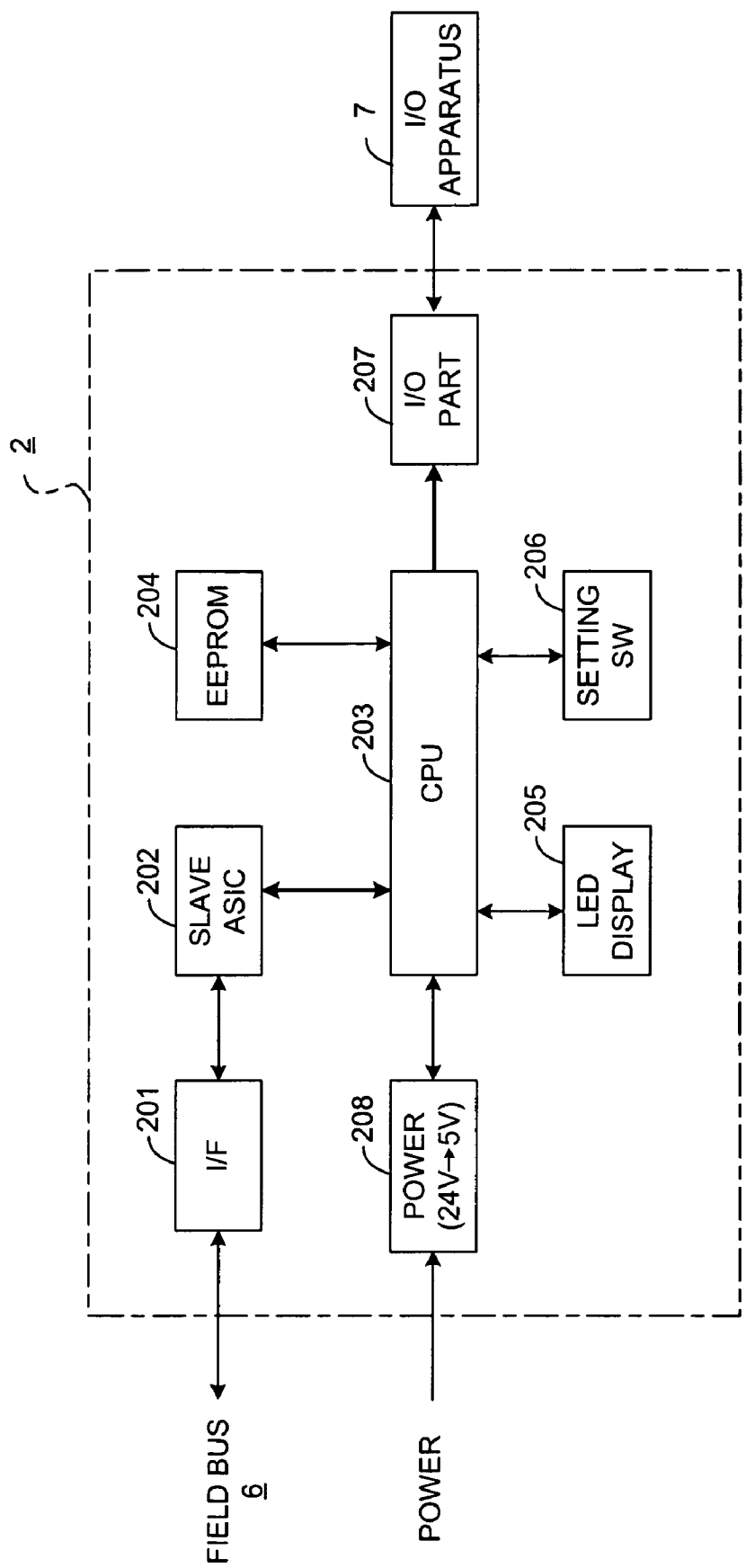
FIG. 3 is a hardware structural diagram of a communication slave unit.

FIG. 3 shows the internal structure of an I/O terminal device 2. As shown, the I/O terminal device 2 includes a communication interface (I/F) 201 functioning as a physical communication layer, a master ASIC 202 (also referred to below as a transmission processing part) which is a circuit in the form of LSI for realizing desired communication functions, a CPU 203 (also referred to below as a reception processing part) which has a microprocessor as its main body and serves to control the device as a whole, a non-volatile memory (EEPROM) 204 for storing set data of various kinds, an LED display device 205 for making displays of various kinds, a setting switch 206 to be used for various setting operations, an I/O part 207 for exchanging data with an I/O apparatus 7 and a DC power source part 208 with a transformer function for supplying a stabilized DC power source to the device as a whole.

I/O data are exchanged between the communication master unit 10 and each of the I/O terminal devices 2 through a 1-to-N master-slave communication by using the communication master unit 10 as the communication master and the I/O terminal device 2 as the communication slaves.

Explained more in detail, output data received from the communication master unit 10 are transmitted to the I/O apparatus 7 (output apparatus) through the I/O part 207 of the I/O terminal device 2, and input data taken into the I/O device 2 from the I/O apparatus 7 (input apparatus) through the I/O part 207 are transmitted to the communication master unit 10.

Figure 4:
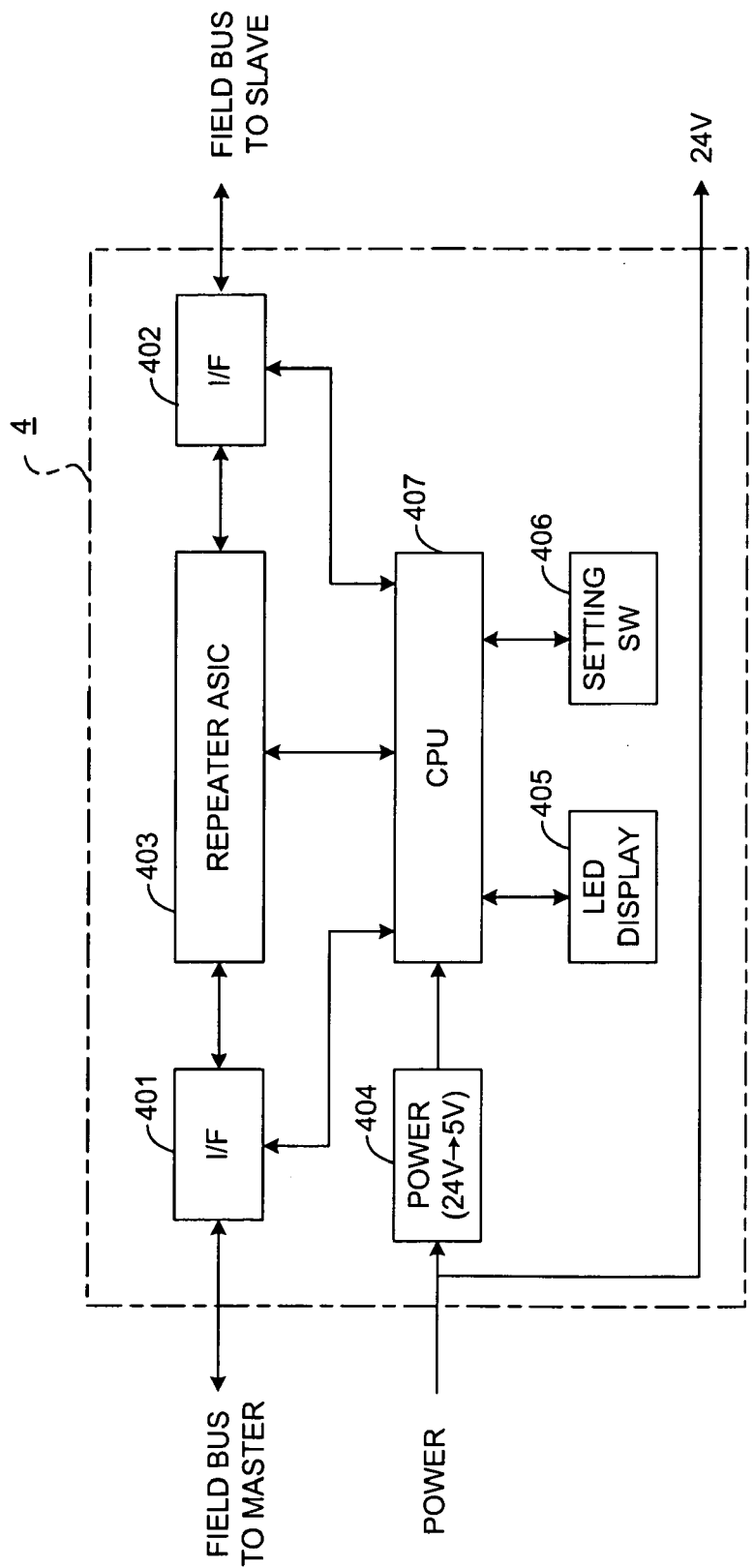
FIG. 4 is a hardware structural diagram of a repeater unit.

FIG. 4 shows the internal hardware structure of a repeater serving as the repeater device. As shown, the repeater 4 is provided with communication interface parts 401 and 402 connected respectively to the master and to a slave, a repeater ASIC 403 which is mounted between these communication interface parts 401 and 402 for carrying out specified processes to transmitted data (signals) and a CPU 407 which has a microprocessor as its main body and serves to control the device as a whole. It is also provided with a power source part 404 for transforming an input voltage (24V) down to 5V to supply it to each element within the repeater 4, as well as a setting switch 406 for setting, an LED display part 405 for indicating an operation status (communication status) and normal/abnormal condition and the node address.

For the purpose of this invention to reduce the repeater delay, it is desirable that each repeater on the network recognize the network structure, or its own set position within the network. With regard to the network structured as shown above, an example of search route for a transmitted communication frame and a method of teaching the network structure data will be explained first.

Each of the master, slave and repeater units shown in FIG. 1 has a different address on the network of the PLC system and the individual identification of each unit is carried out by its address. From the rise-up control of the network to the normal communication, the method of this invention for teaching network structure data is applied.

To start, the first frame which is broadcast (1-to-N communication) from the master unit is used as medium to transmit unit addresses from the master unit to the repeater units and from the repeater units to the slave units such that data on the neighboring unit on the upstream side are generated and stored by each of the repeater and slave units of the network.

This operation may be carried out before the master unit comes to acknowledge the repeater and slave units connected to the network such as when power is first switched on or after the master unit comes to recognize the repeater and slave units connected to the network such as during the operation of the network.

Figure 5:
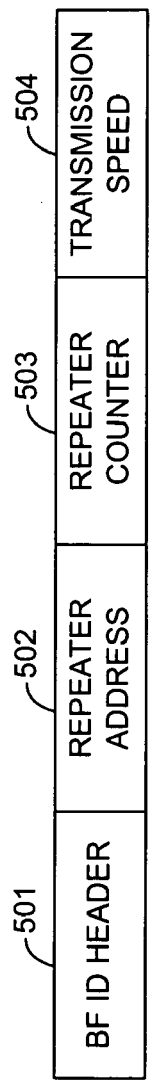
FIG. 5 shows the frame format of beacon frame (BF).

What is commonly referred to as the solicit frame or the beacon frame corresponds to this operation. In what follows, expression "beam frame" (written as BF) is used but what is commonly known as solicit frame is intended to be included in its meaning. FIG. 5 shows a frame format of BF.

As shown in FIG. 5, the BF flowing though the field bus 6 contains at least a BF identification header 501 for identifying that this is a BF, a repeater address 502 which is updated whenever it passes a repeater unit by the address value of this repeater being passed, a repeater counter 503 of which the value is incremented by +1 whenever it passes a repeater unit and a transmission speed 504 which indicates the communication transmission speed of the BF.

The master unit broadcasts the BF simultaneously to all of the repeater and slave units connected to the network. The transmitted BF reaches the slave units either directly or by passing through one or more repeater units. Although the BF, passing through various routes, experiences delays according to the route and the number of repeater units that are passed, it may be considered to reach all of the repeater and slave units nearly simultaneously as a whole.

Figure 6:
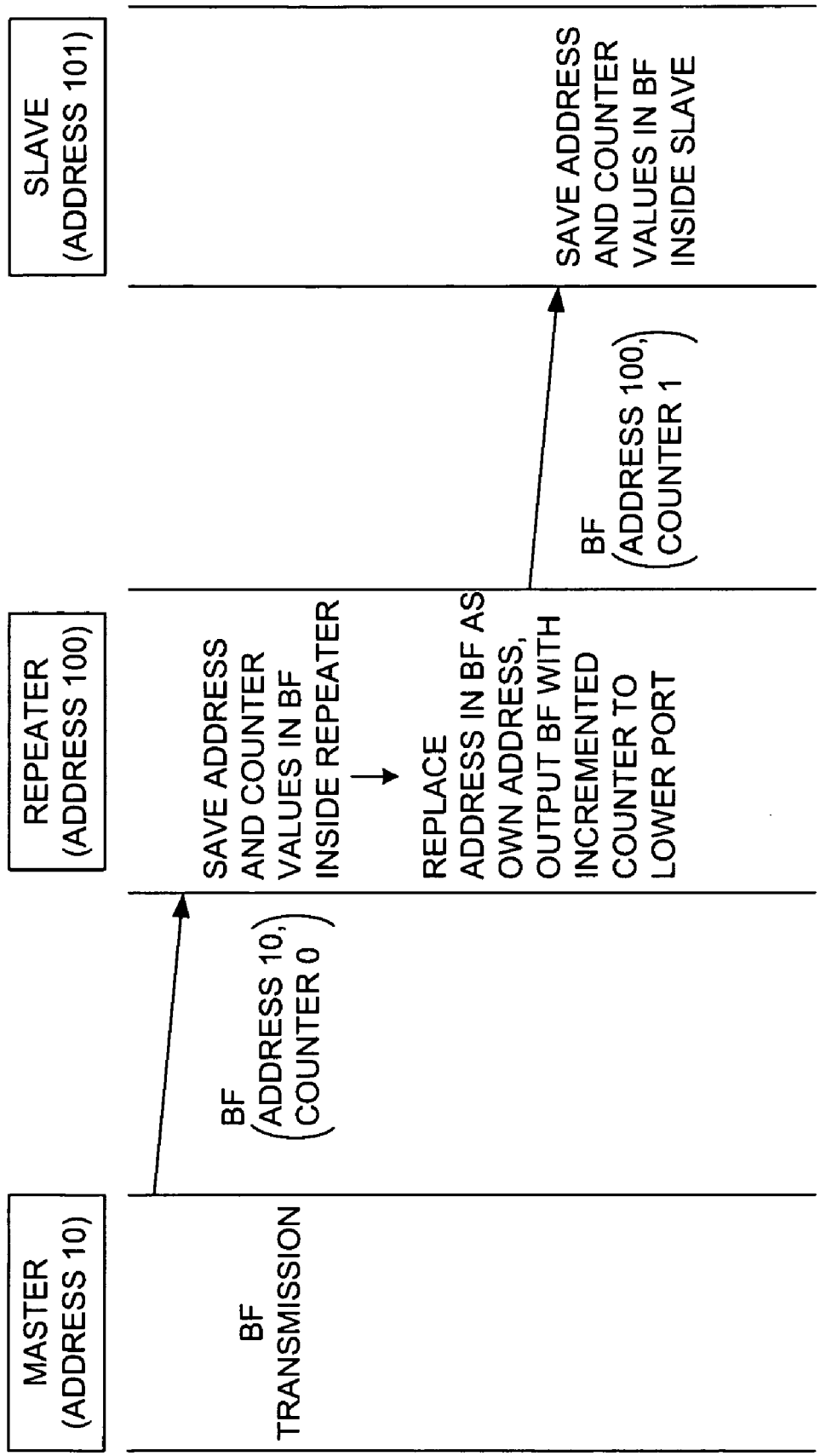
FIG. 6 is a schematic drawing showing the sequence of frame transmission.

A sequence of frame transmission is schematically presented in FIG. 6. As shown, BF having "10" as the value of repeater address and "0" as the value of repeater counter is broadcast from the master unit (with address "10") onto the network As this BF is received by the repeater unit with address "100" through its port on the upstream side, the value ("10") of the repeater address 502 and the value ("0") of the repeater counter 503 of this BF are read out of the BF and saved in a memory inside this repeater unit (with address "100"). Thus, this repeater unit comes to recognize its relative position within the network because it now knows that the address of its upstream neighbor is "10". In this case, the unit address of "10" becomes the "upstream neighbor data" created by this repeater (with address "100").

Thereafter, the value of the repeater address 502 in the BF is changed from "10" (which is the address of the master unit adjoining on the upstream side) to "100" (which is now the repeater address, or the address of this repeater itself). At the same time, the value "0" of the repeater counter 503 is incremented by +1 and changes to "1". Thus, a new BF with the value of its repeater address 502 replaced and the value of its repeater counter 503 increased by one is transmitted through its port on the downstream side to the next slave unit (with address "101") on the next stage (on the downstream side).

As the BF which was transmitted from the repeater unit with address "100" is received by the slave unit with address "100", the value "100" of the repeater address 502 and the value "1" of the repeater counter 503 in this BF are read out of it and stored in the memory in the slave unit with address "101". It is in this manner that the slave unit with address "101" comes to "know" the relative position of itself by recognizing "100" as the address of the unit adjoining to it on its upstream side. In this case, since the unit address of the adjoining unit on the upstream side is "100", this unit address of "100" becomes its "upstream neighbor data".

As a data saving process is thus carried out, the BF which is broadcast from the master unit serves as the medium for transmitting the unit address from the master unit with address "10" to the repeater unit with address "100" and from the repeater unit with address "100" to the slave unit with address "101" such that the upstream neighbor data and the repeater counter value are generated and come to be stored both in the repeater unit with address "100" and the slave unit with address "101".

Although FIG. 6 shows an example with only one repeater unit between the master and slave units but the operations by each of the repeater and slave units are the same as explained above even where there are two or more repeater units or no repeater unit between the master and slave units.

Figure 7:
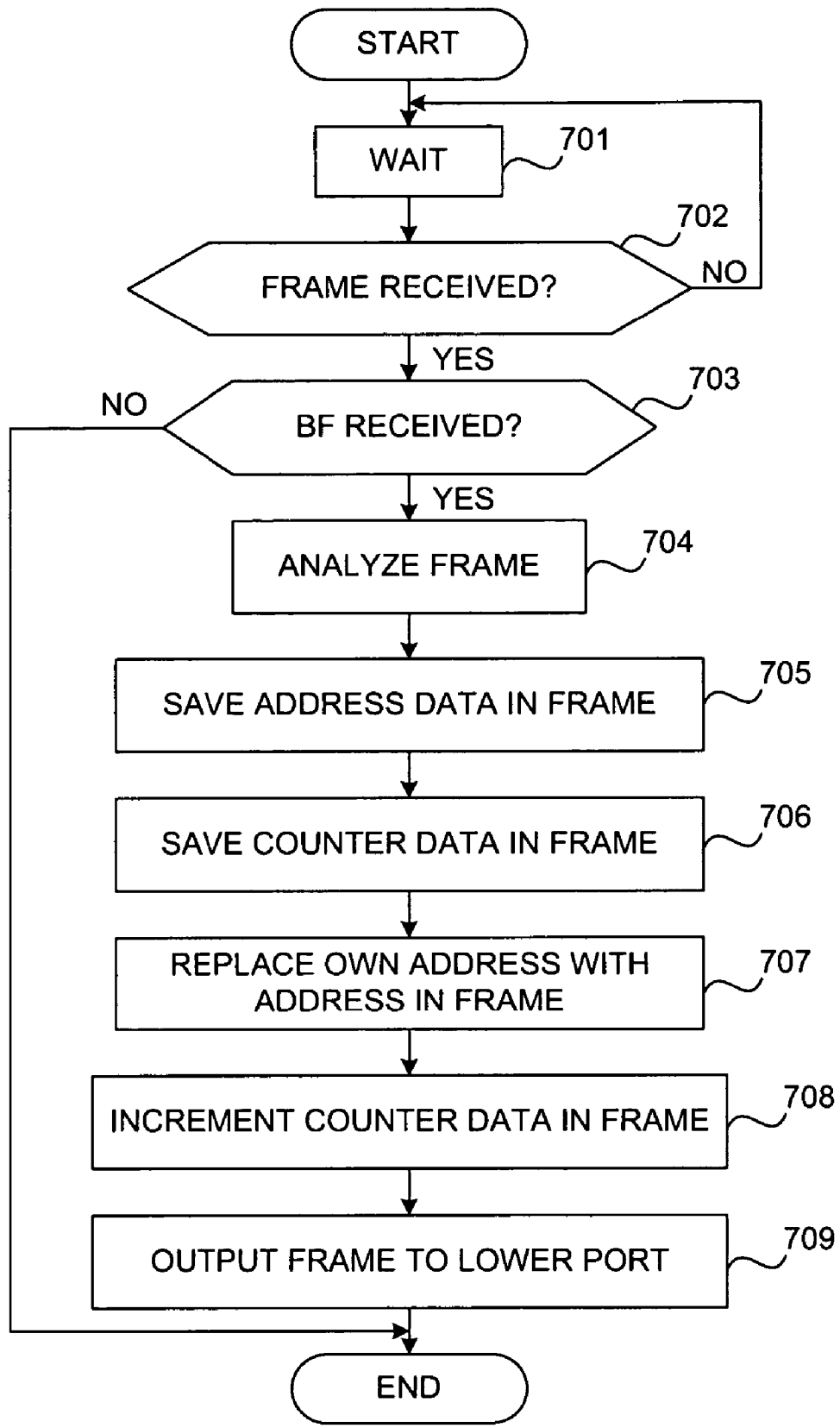
FIG. 7 is a flowchart of operations by a repeater unit when a BF is received.

FIG. 7 is a flowchart, showing the flow of operations by a repeater unit when a BF is received. It is to be understood that the operations shown by this flowchart are carried out by the CPU 407 within the repeater 4 shown in FIG. 4.

As shown in FIG. 7, a wait process is initially carried out (Step 701). If a frame is received during its operation (YES in Step 702) and if it is determined from its header 501 that the received frame is a BF (Yes in Step 703), the frame is analyzed first and its structure is recognized (Step 704). Next, the address data (or the repeater address 502) and the counter data (or the repeater counter 503) in the frame are read out and stored in a specified memory (Steps 705 and 706), and the address data in the frame (or the repeater address 502) replace its own address (Step 707). Next, the counter data (or the repeater counter 503) in the frame are incremented by +1 (Step 708) and the new frame thus obtained is transmitted to the port on the downstream side (Step 709).

Figure 8:
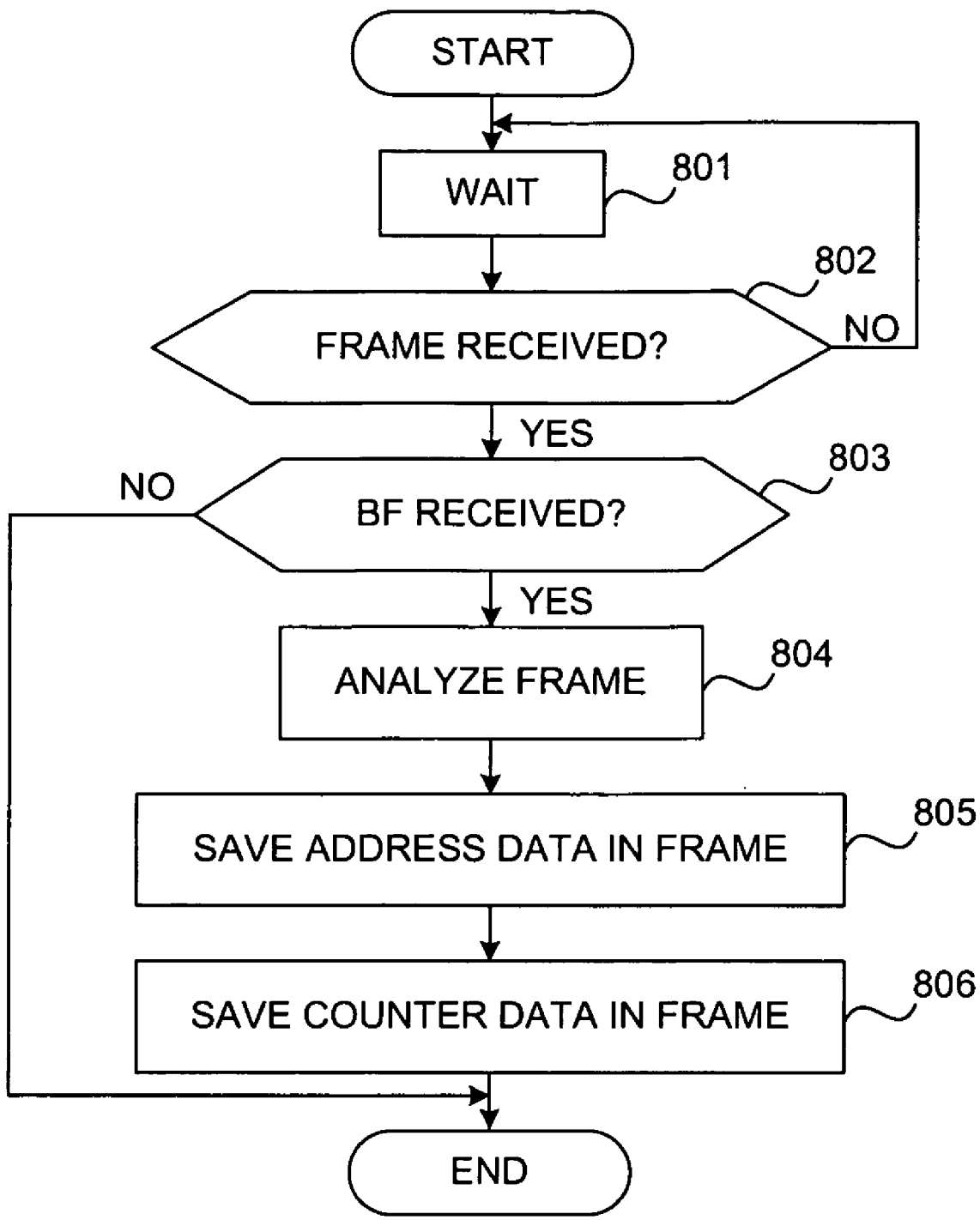
FIG. 8 is a flowchart of operations by a slave unit when a BF is received.

FIG. 8 is a flowchart, showing the flow of operations by a communication slave unit when a BF is received. It is to be understood that the operations shown by this flowchart are carried out by the CPU 203 within the I/O terminal device 2 shown in FIG. 3.

As shown in FIG. 8, a wait process is initially carried out (Step 801). If a frame is received during its operation (YES in Step 802) and if it is determined from its header 501 that the received frame is a BF (Yes in Step 803), the frame is analyzed first and its structure is recognized (Step 804). Next, the address data (or the repeater address 502) and the counter data (or the repeater counter 503) in the frame are read out and stored in a specified memory (Steps 805 and 806) as its "upstream neighbor data".

As upstream neighbor data and repeater counter values come to be stored in all of the repeater and slave units as explained above and it is fed back to the master unit, the master unit finally grasps the overall structure of the system as a whole. It is to be noted, however, that there are other methods for teaching the system structure, besides that of using a BF. For example, the operator may check the number of intervening repeater units between the master unit and each of the slave units, based on the actual network structure, and register such numbers in the master unit. This may be done, for example, by transmitting such number data from the setting device 3 to the master unit to have them registered. By this method, the master unit will thereafter transmit the received data to the individual slave units to have them registered. As another method, the operator may undertake to cause the checked numbers to be registered by the slave units. By this method, the checked number data are directly transmitted from the setting device 3 to the individual slave units and registered. As a variation of the latter method, an operation button may be provided to each of the slave units such that the operator can press it the same number of times as the number of the intervening repeater units.

Next, FIGS. 9-16 are referenced to explain a method of reducing the repeater delay that would arise at the repeater units on the network. In these figures, numeral 30 indicates a master unit (corresponding to the master unit 10 of the PLC in a similar manner which is indicated with respect to master unit 70 of FIG. 17), symbols 40a-40e each indicate a slave unit, symbols 50a and 50b each indicate a repeater unit, numeral 31 indicates a network trunk line and numerals 32 and 33 each indicate a network branch line branching away from the network trunk line.

As will be explained in detail below, frames of different kinds are exchanged by a PLC system of this invention. They include frames of the kind that are transmitted only from the master unit to a slave unit such as "BeaconFrame" (beacon frame), "OutFrame" (out frame) and "TrgFrame" (trigger frame or request frame); frames of the kind that are transmitted only from a slave unit to the master unit such as "ConnectionFrame" (connection frame) and "InFrame" (in frame); and frames of the kind that are transmitted in both directions such as "EventFrame" (event frame). The repeater units are adapted to identify each of these kinds and are characterized as transmitting the frames only in the necessary direction. In the above, "BeaconFrame" is what was referred to as the solicit frame or the beacon frame and is transmitted periodically from the master unit, serving to inform the transmission speed and the number of passed repeater stages to the slave unit; "OutFrame" (out frame) is for transmitting the results of execution of the user program by the PLC as output data from the master unit to the slave unit; "TrgFrame" (trigger frame) is for requesting a return of ConnectionFrame (connection frame) from the master unit to the slave unit; "ConnectionFrame" (connection frame) is for the slave unit to return to the master unit when the slave unit has received the trigger frame if it is specified by the trigger frame, the master unit carrying out acknowledgment of existence or subscription process to the slave unit that returned ConnectionFrame; "InFrame" (in frame) is for returning input data taken in by the slave unit from an input apparatus to the master unit; and "EventFrame" (event frame) is for transmitting some data from the slave unit apart from the in frame to the master unit in response to a request from the master unit.

Figure 10:
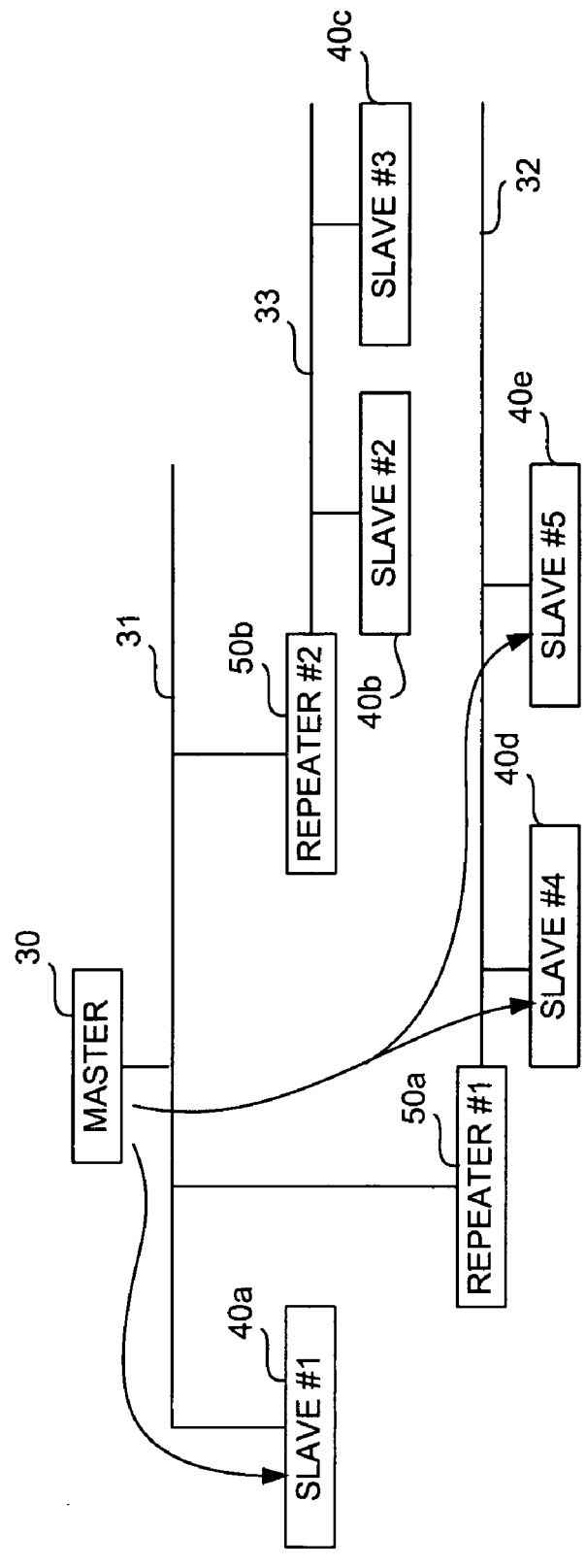
FIG. 10 is a drawing for showing the transmission of frames from the master unit to the slave units.
Figure 11:
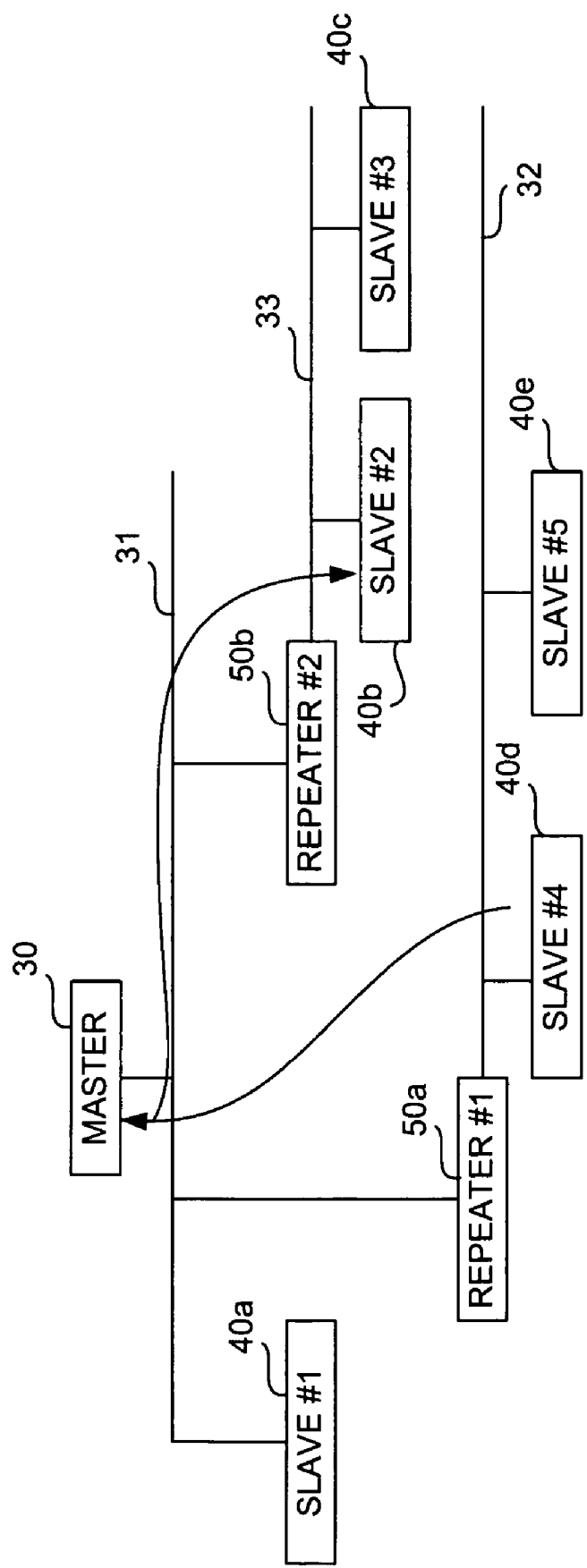
FIG. 11 is a drawing for showing the transmission of frames from the slave units to the master unit.

As shown in FIGS. 10 and 11, the PLC system of this invention comprises a master unit 30 for controlling the network containing a bus, slave units 40 for controlling I/O, etc. and repeater units 50 for shaping and amplifying communication frames.

Figure 9:
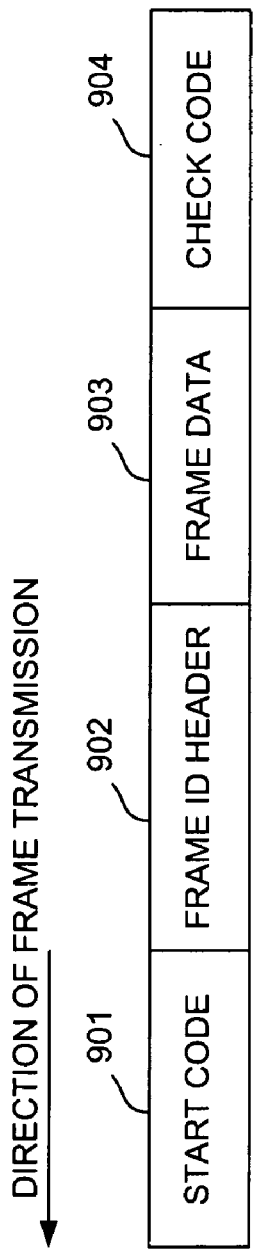
FIG. 9 is a structural diagram of a frame.

FIG. 9 shows the basic structure of each frame. As shown, each frame includes at least the following four elements; (1) a start code 901 which indicates that the frame is starting, (2) a frame ID header 902 which indicates the kind of the frame, (3) frame data 903 which indicate the content of the frame, and (4) a check code 904 (such as CRC data) which indicates properness of the frame. Each repeater unit 50 on the network serves to shape the waveform as the start code 901 is recognized and begins an output process to the other port. The shaping of the waveform makes it possible to increase the extension of the network.

If the repeat process is carried out at the moment when the start code 901 is identified, the data to be transmitted from the slave unit 40 to the master unit 30 are also repeated to the other slaves. This means that data are transmitted also to unnecessary repeat segments and hence that the occupation efficiency of the network is adversely affected.

FIG. 10 shows the frame transmission from the master unit 30 to the slave units 40. Since the frames transmitted from the master unit 30 to the slave units 40 are broadcast frames, they can be repeated all at the same time. In the example shown in FIG. 10, frames from the master unit 30 are transmitted not only to slave unit 40a but also to slave units 40d and 40e through repeater unit 50a. Although not indicated by arrows, frames are also transmitted to slave units 40b and 40c through repeater unit 50b.

FIG. 11 shows the frame transmission from a slave unit to the master unit. When a frame is transmitted from slave unit 40d to the master unit 30, as in the illustrated example, repeater unit 50a carries out the shaping and amplification operations on the frame and then transmits the frame to the master unit 30. According to the prior art technology, repeater unit 50b also received the same frame and transmitted it to the port on the downstream side. As a result, slave units 40b and 40c were deprived of sufficient network free time during which transmission was possible to the master unit 30 and this meant that the communication efficiency of the network was adversely affected.

Figure 12:
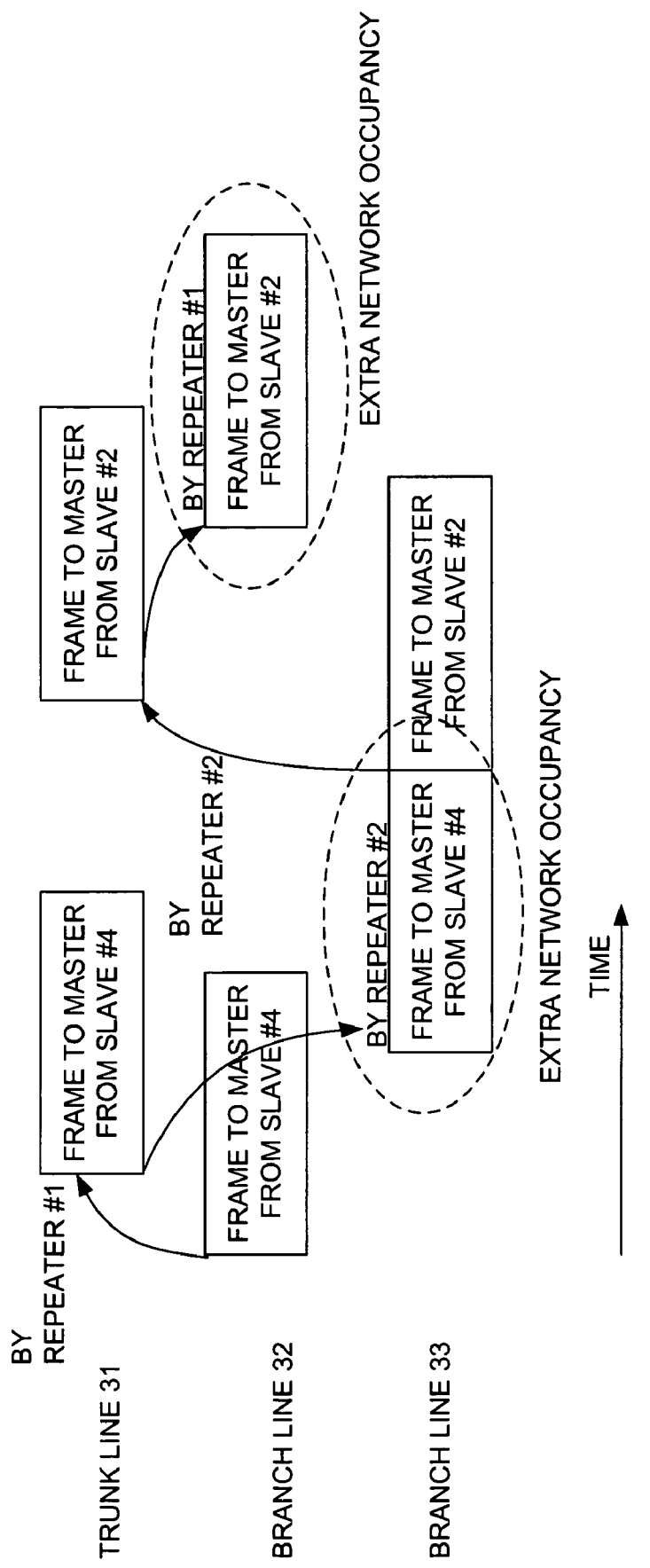
FIG. 12 is a diagram for showing the network occupancy ratio according to a prior art technology.

FIG. 12 shows the network occupancy ratio in this situation. As indicated therein, the frame address to the master unit 30 from slave unit 40d (Slave #4) on network branch line 32 is repeated by repeater unit 50a (Repeater #1) to be transmitted into network trunk line 31 and is transmitted therethrough to the master unit 30. This frame, however, is transmitted not only to the master unit 30 but also repeated by repeater unit 50b (Repeater #2) on network branch line 33 and transmitted to slave unit 40b (Slave #2). In other words, the frame which is originally addressed to the master unit 30 is also transmitted to the slave unit 40b (Slave #2) through network branch line 32 and repeater unit 50b (Repeater #2). As a result, there occurs an extra occupancy of network branch line 32 because the frame addressed to the master unit 30 from slave unit 40d (Slave #4) is repeated, and the transmission of the frame from slave 40b (Slave #2) addressed to the master unit 30 is delayed accordingly.

Although not shown in FIG. 12, the frame addressed to the master unit 30 from slave unit 40b (Slave #2) is similarly also transmitted through repeater unit 50a (Repeater #1) to slave units 40d and 40d (Slaves #4 and #5), giving rise to the occurrence of extra network occupancy on network branch line 32.

Figure 13:
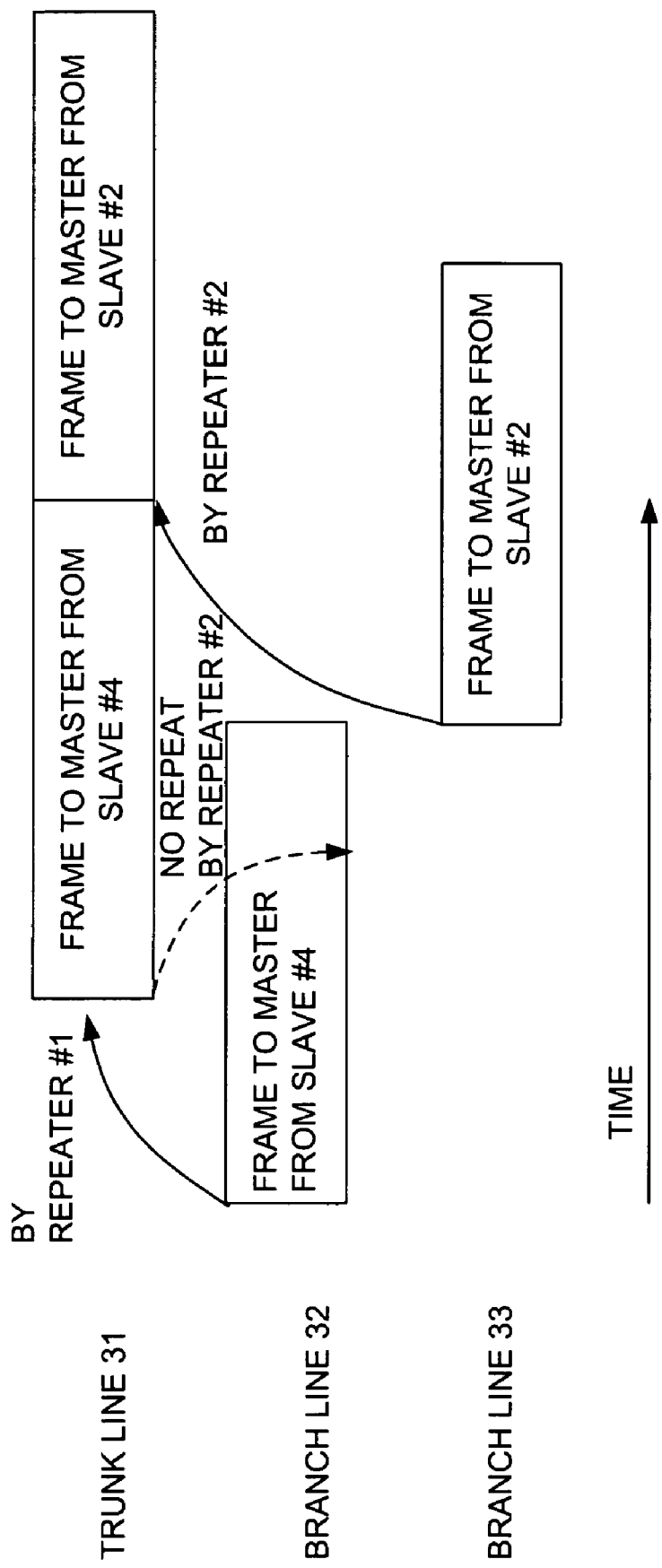
FIG. 13 is a diagram for showing the network occupancy ratio according to this invention.

FIG. 13 shows a situation according to the present invention wherein each repeater unit is adapted to identify the received frame and not to carry out unnecessary repeat operations. As can be clearly understood by comparing FIGS. 12 and 13, repeater unit 50b (Repeater #2) identifies the frame addressed to the master unit 30 from slave unit 40d (Slave #4) in the case of FIG. 13 and does not carry out the repeat operation. Thus, the occurrence of wasteful extra network occupancy is prevented and the frame from slave unit 40b (Slave #2) addressed to the master unit 30 can be transmitted smoothly. Thus, since each repeater unit functions to check the identification header of each frame that is received and carries out its repeat operation only in the necessary direction, sufficient communication time can be secured on network branch lines and the network efficiency can be improved. FIG. 13 illustrates the securing of communication time on network branch line 32, but it goes without saying that the same securing can be accomplished on the other network branch lines such that the overall network efficiency can be improved.

Figure 14:
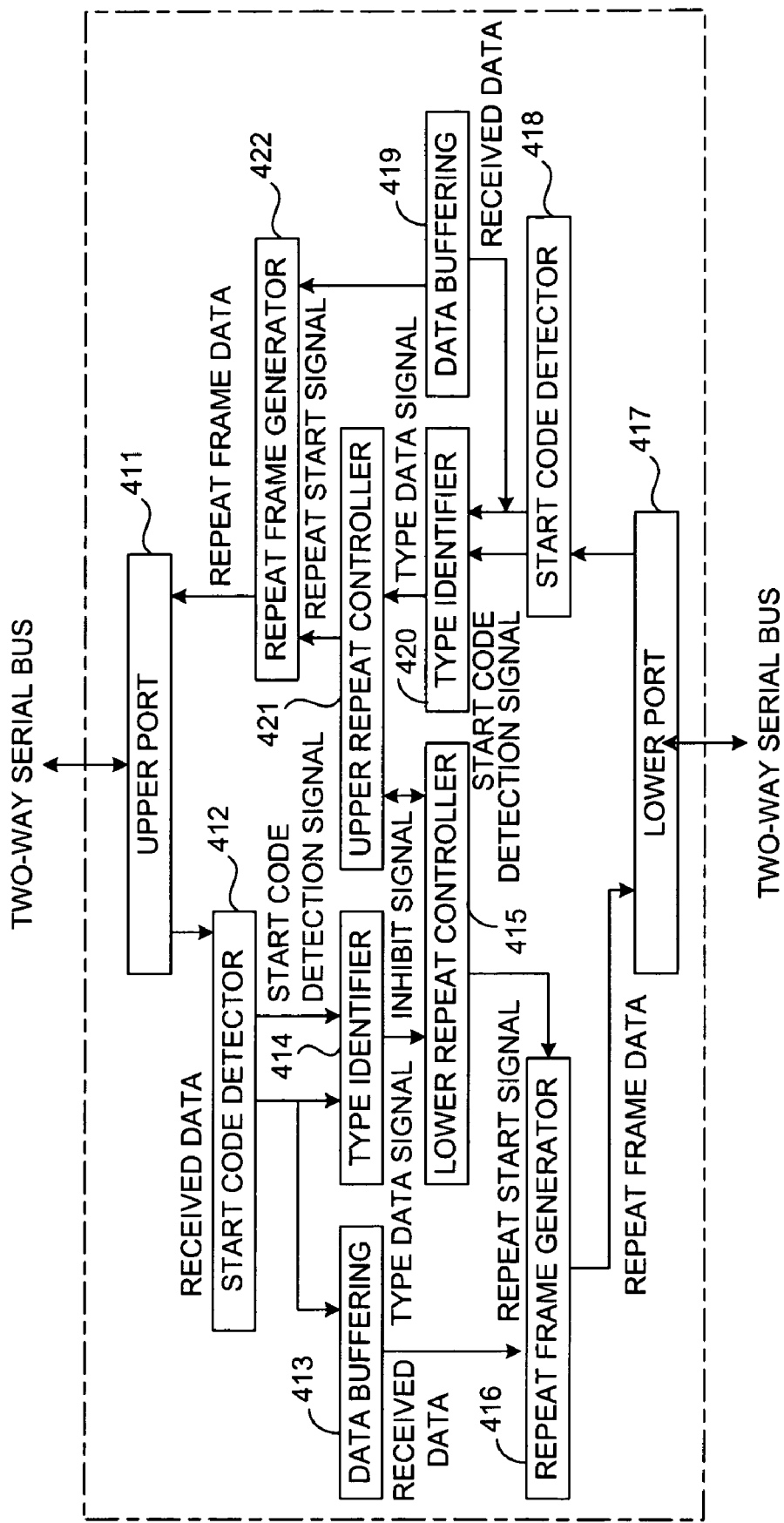
FIG. 14 is a functional block diagram of a repeater unit embodying this invention.

FIG. 14 is a block diagram of a repeater unit thus adapted to distinguish the frames and not to carry out unnecessary repeat operations. As shown in FIG. 14, the repeater unit is connected through a two-way serial bus to a network through a port 411 on the upstream side ("upper port") and another port 417 on the downstream side ("lower port").

A situation where a frame has been received from the upstream port 411 is explained first. The frame (received data) transmitted to the upper port 411 through the two-way serial bus is transmitted to a start code detector 412, and the received data are saved from the start code detector 412 in a data buffering part 413 and later transmitted to a repeat frame generator 416. At this moment, the start code detector 412 not only transmits the received data to the data buffering part 413 but also transmits the received data and a start code detection signal to a frame type identifier 414 by which the type of the frame is identified and the result of this identification is transmitted to a lower repeat controller 415. The lower repeat controller 415 serves to judge whether or not the received frame is one to be repeated.

The method of judgment by the lower repeat controller 415 is explained next. As explained above, each repeat unit on the network already knows its own position on the network and its relative position with respect to the other repeater units and slave units by using a network structure data teaching method. In the present example, the object of judgment is a frame received through the upper port 411 on the upstream side, the judgment is for determining whether this frame received from the upstream side should be further repeated to the downstream side. Thus, if the received data of the received frame are from the master unit to a slave unit, it is judged that the frame should be flowing from the upstream side of the network in the direction of the downstream and should be further repeated downstream through the lower port. If the received data of the received frame are from a slave unit addressed to the master unit, on the other hand, it is judged because the master unit is on the upstream side of the repeater unit that it is a frame not to be repeated downstream through the lower port.

If the result of the judgment is that this is a frame to be repeated, a repeat start signal is transmitted to a repeat frame generator 416. As the repeat start signal is received, the repeat frame generator 416 transmits the received data saved in the data buffering part 413 as the repeat transmission frame data through the lower port 417 onto the network. The lower repeat controller 415 serves not only to transmit the repeat start signal to the repeat frame generator 416 but also to transmit an inhibit signal to an upper repeat controller 421. This is because there are situations where a repeater unit may receive a frame which was transmitted by itself. The inhibit signal is transmitted when frame data are transmitted through the lower port 417 in order to prevent the upper port 411 from receiving the frame through the upper repeat controller 421.

If the lower repeat controller 415 decides that there is no need for repeat operation, the repeat start signal is not generated and the received data are not repeated.

Next, a situation where a frame has been received by the lower port 417 is explained. The frame (received data) transported to the lower port 417 through the two-way serial bus is transmitted to a start code detector 418, and the received data are stored from the start code detector 418 in a data buffering part 419 and later transmitted to a repeat frame generator 422. At this moment, not only are the received data transmitted to the data buffering part 419 but the received data and a start code detection signal are also transmitted to a frame type identifier 420. As the start code detection signal is transmitted to the frame type identifier 420, the type of the frame is identified and the result of this identification is transmitted to the upper repeat controller 421 as a frame type data signal. The upper repeat controller 421 judges whether a repeat operation should be carried out through the upper port 411, depending on the type of the frame indicated by the frame type data signal. The data buffering part 413 and the data buffering part 419 are together referred to below as a frame receiving means, and the frame type identifier 414 and the frame type identifier 420 are together referred to below as a type identifying means.

The method of judgment by the upper repeat controller 421 is similar to that explained above for the situation of reception through the upper port 411. Since the judgment in the present example is on a frame received from the downstream side, received data from a slave unit addressed to the master unit are judged as a frame that should be transmitted from the downstream side and should be repeated further in the upstream direction through the upper port 411. If the received data are from the master unit to a slave unit, it is judged, because the slave unit is on the downstream side of the repeater unit, that this is a frame not required to be repeated through the upper port to the master unit on the upstream side.

If it is determined by such judgment process that a repeat operation is required, a repeat start signal is transmitted to the repeat frame generator 422. As this repeat start signal is received, the repeat frame generator 422 serves to transmit the received data stored in the data buffering part 419 onto the network through the upper port 411 as the repeat transmission frame. The upper repeat controller 421 not only transmits the repeat start signal to the repeat frame generator 422 but also transmits an inhibit signal to the lower repeat controller 415. This is because, as explained above, there are situations where a repeater unit may receive a frame transmitted by itself. The inhibit signal is transmitted when frame data are transmitted through the upper port 411 in order to prevent the lower port 415 from receiving the frame through the lower repeat controller 415.

If the upper repeat controller 421 decides that there is no need for repeat operation, the repeat start signal is not generated and the received data are not repeated.

Figure 15:
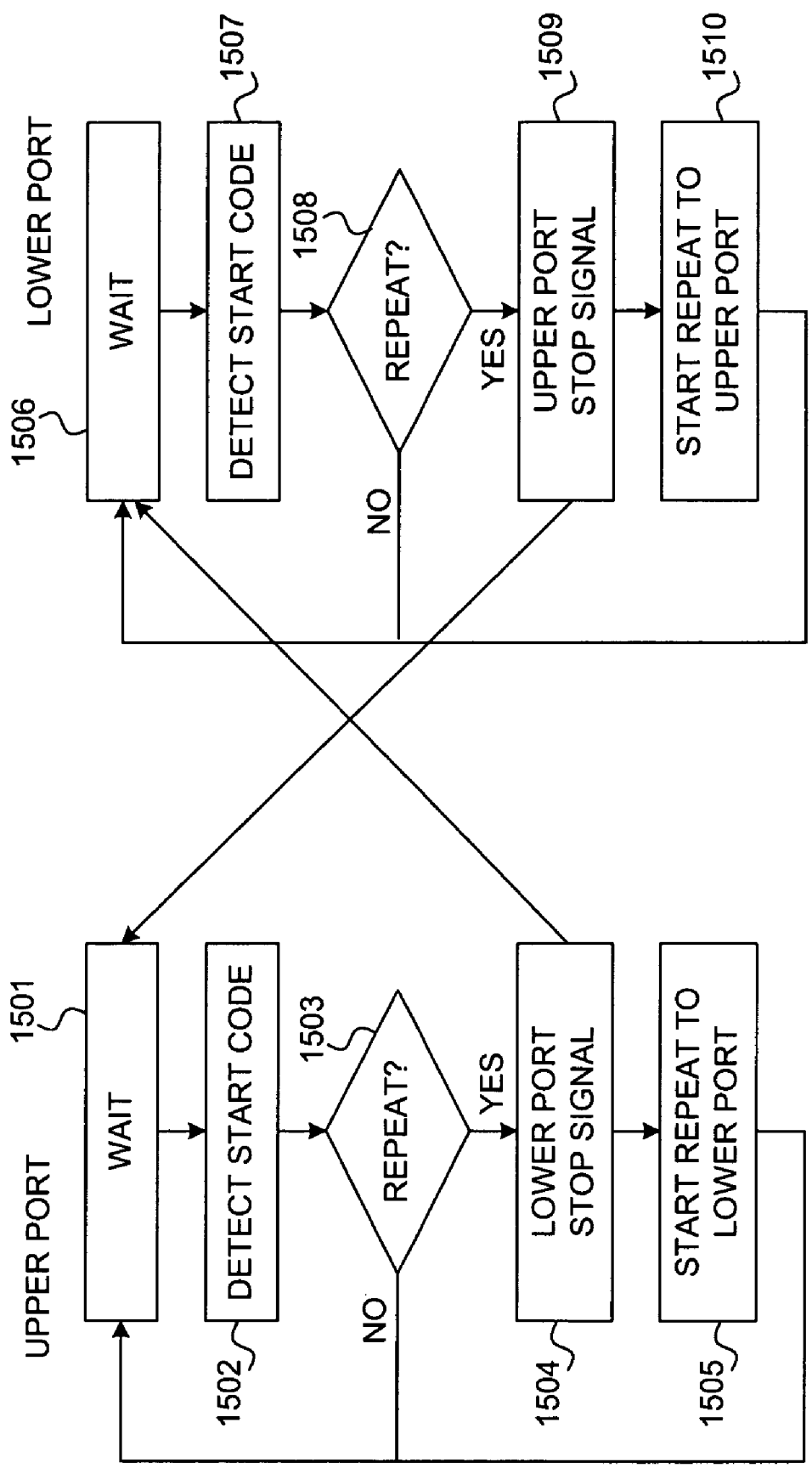
FIG. 15 is a flowchart of operations by a repeater unit.

Operations carried out by a repeat unit are shown by the flowchart of FIG. 15. As shown, the upper port side is initially in a wait condition for receiving a frame (Step 1501). As a frame is received, its start code is detected (Step 1502), identification of the header is carried out on the basis of the frame identification header contained in the frame as explained above with reference to FIG. 9 and it is judged whether this frame is of a type to be repeated (Step 1503). If the frame is determined to be the type to be repeated (YES in Step 1503), a stop signal (for receipt and repeat operations) to the lower port is transmitted (Step 1504) and the repeat operation to the lower port is started thereafter (Step 1505). If the frame is determined to be the type not to be repeated (NO in Step 1503), the repeat operation is not carried out and the receipt of next frame is waited for (Step 1501).

The lower port side also starts in a wait condition (Step 1506). After a frame is received, its start code is detected (Step 1507) and the type of the frame is determined from the frame identification header contained in the frame (Step 1508). If the frame is the type to be repeated (YES in Step 1508), a stop signal to the upper port is transmitted (Step 1509) and the repeat operation to the upper port is started thereafter (Step 1510). If the frame is determined to be the type not to be repeated (NO in Step 1508), the repeat operation is not carried out and the receipt of the next frame is waited for (Step 1506).

With a repeater thus structured, the type of each received frame is determined and only the frames to be repeated are repeated. Although a network structure with two repeat units and five slave units was considered above, it goes without saying that similar processes are possible and similar effects can be obtained with networks with a different structure.

A repeater unit provided with such function may be adapted to switch between a frame to be repeated and a frame not to be repeated by setting means. Similarly, it may be arranged to provide by setting means a (time) period during which the repeat operation is not carried out.

A repeater unit thus structured may be further adapted to stop the repeat operation itself. In this manner, an independent network may be caused to be present, separated by such a repeater unit with its repeat operation stopped.

Figure 16:
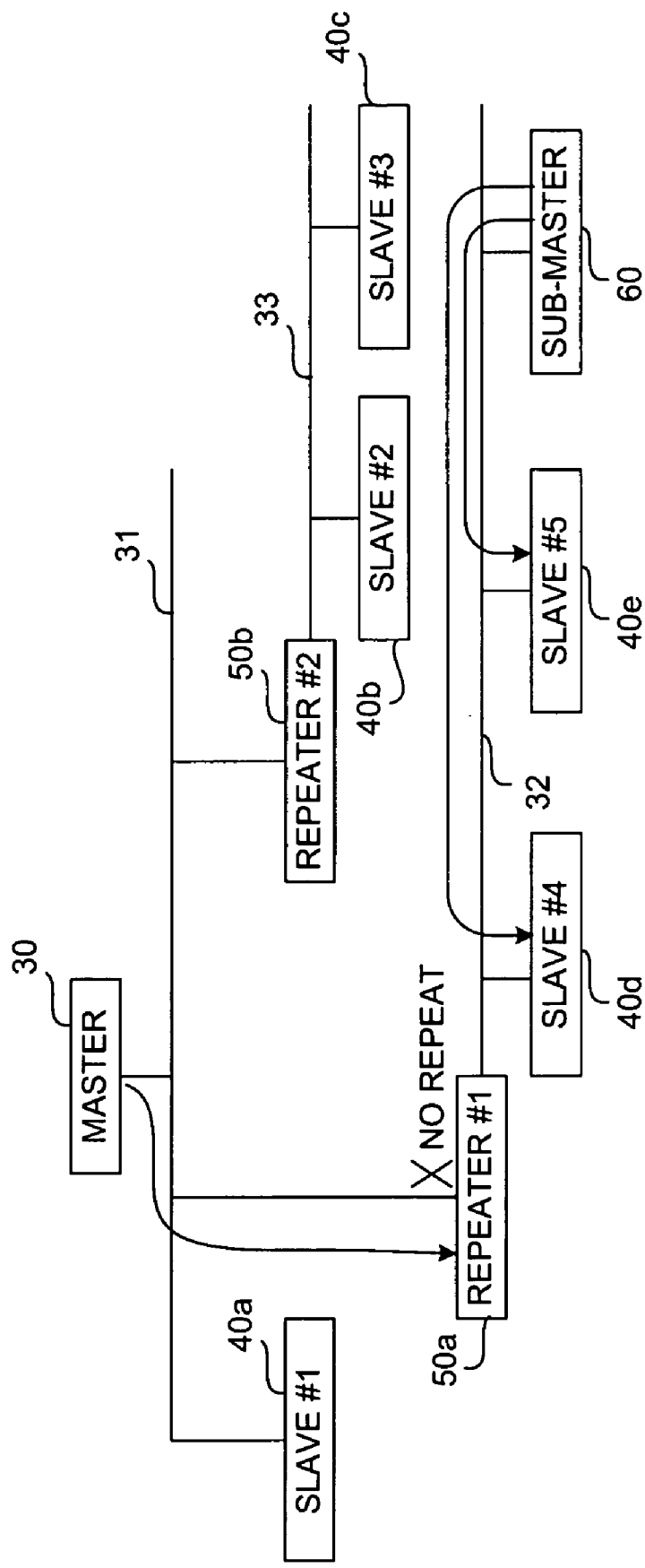
FIG. 16 shows the structure of an example of independent network using a sub-master unit.

FIG. 16 shows an example of an independent network separated by one of the repeater units within a network. Since the basic structure of this network is similar to that of FIGS. 10 and 11, like or similar constituent elements are indicated by the same symbols and will not be described repetitiously. The network structure shown in FIG. 16 is different from that of FIGS. 10 and 11 in that what is referred to as a sub-master unit 60 is set on network branch line 32. With a network structure as shown in FIG. 16 and the repeat operation of repeater unit 50a on network branch line 32 stopped, an independent network separated by this repeater unit 50 with its repeat operation stopped can be formed. Explained more in detail, an independent network is formed with the network branch line 32 which is separated by repeater unit 50a, slave units 40d and 40d which are on this network branch line 32 and this newly set sub-master unit 60 which serves to make high-speed communications within this independent network possible.

The network which has thus been made independent can be returned again into the same network by transmitting a return-indicating frame from the sub-master unit 60 to repeater unit 50a. When a return-indicating frame is received, repeater unit 50a transmits a frame indicative of the returned status to the master unit 30 and resumes its repeat operation, the network becoming recovered.

When this routine is followed, it may sometimes take a long time to return to the network. In such a situation, the upper port of the repeater unit of which the repeat operation is stopped (repeater unit 50a in this example) may be set such that the repeat operation is stopped only for a specified time period after a specified frame has been received. In this manner, an independent network can be structured which normally functions as a part of the network but is separated from the network by stopping the repeat operation for a specified time period when a specified frame is received from the master unit. If the sub-master unit 60 is arranged so as to function only while the repeater unit is stopping its repeat operation, it is possible to make it function as an independent network for the specified time period, to resume the repeat operation after the end of the time period and to return to the normal network. In summary, this is how to efficiently form an independent network separated by a repeater unit, to carry out high-speed communications within this independent network and to easily return to the normal network.

Figure 17:
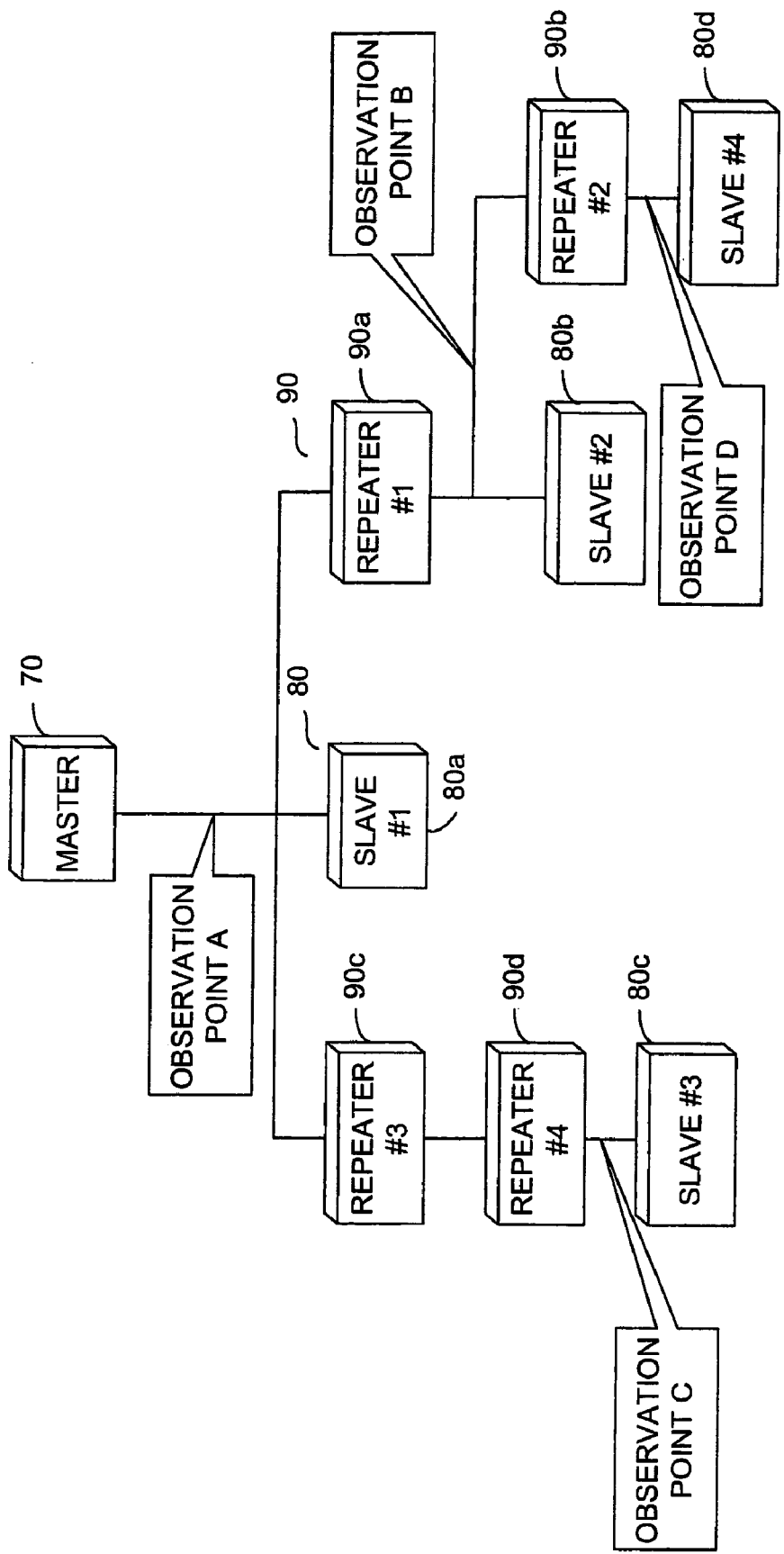
FIG. 17 is a system structure diagram of a network with repeater units in two stages.

Flows of communication frames on a network embodying this invention will be described next with reference to FIGS. 17-20. FIG. 17 is a system structure diagram of a network used before for the explanation of a prior art example but a situation where the present invention is used on the same system structure will be explained next. Since the structure of FIG. 17 has thus already been explained, it will not be described here repetitiously.

Figure 18:
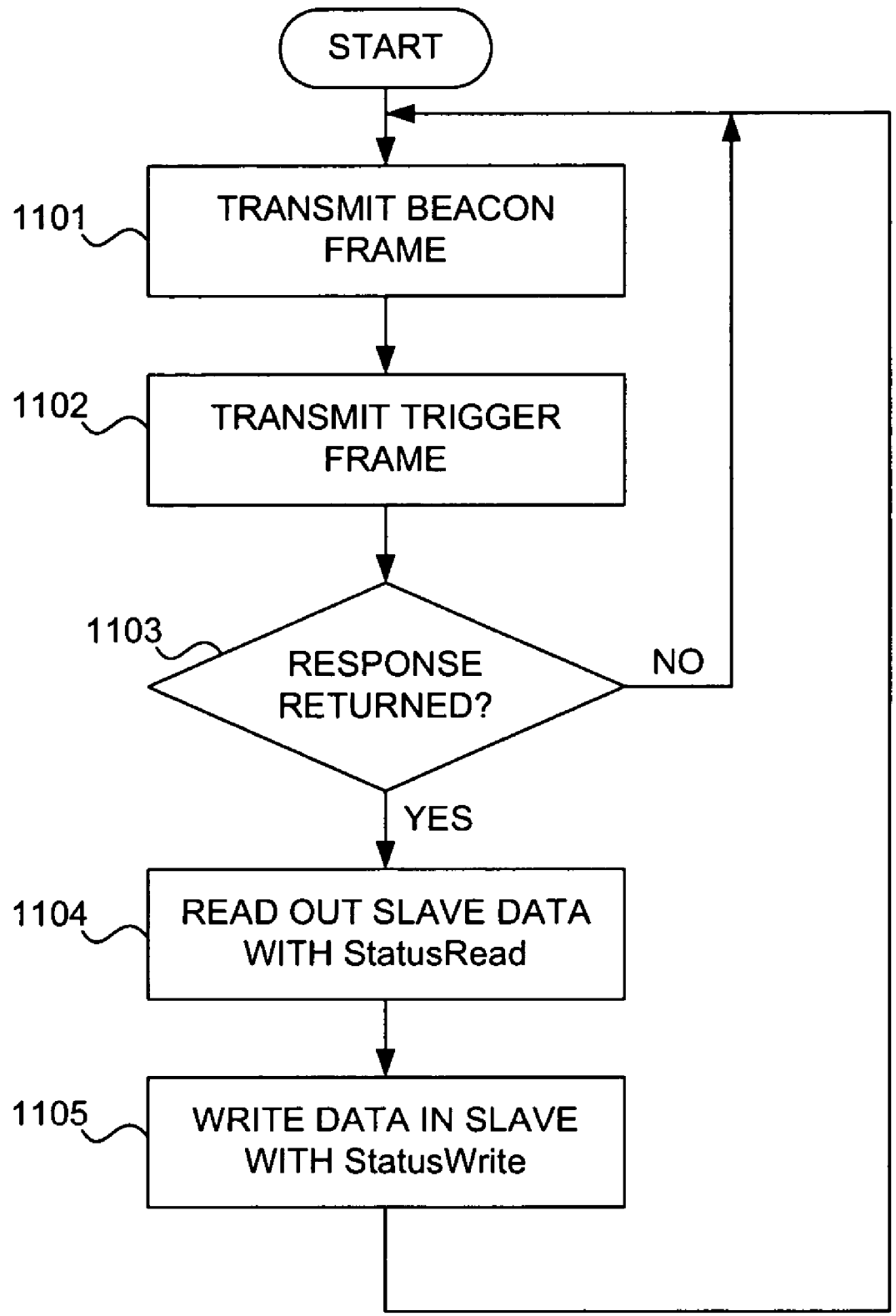
FIG. 18 is a flowchart of the operations of the master unit.

Operations of the master unit in a network system thus structured are explained next with reference to the flowchart of FIG. 18. As shown, the master unit transmits BF (Beacon frame) by broadcasting at specified intervals (Step 1101). This BF serves to inform each slave unit how many repeater units (stages) there are on the transmission route from the master unit. Next, the trigger frame is transmitted (Step 1102), which is transmitted to a specified address and includes the instruction to transmit a response frame after it is received by the addressee slave unit. After the trigger frame is transmitted, therefore, the master unit checks whether the response frame has been returned (Step 1103). If the response frame is returned (YES in Step 1103), what is herein referred to as subscription process is carried out for the slave unit which transmitted the response frame. In this process, a frame (referred to as StatusRead frame) is transmitted for reading out slave data by receiving a response from the addressed slave unit (Step 1104). The master unit comes to grasp the network structure from the slave data thus transmitted back, including the type of the slave unit and the number of repeater units in between, and a time domain is generated based on the received slave data. Thereafter, as another part of the subscription process, StatusWrite frame that includes the generated time domain is transmitted to the slave unit to carry out a write process into the slave unit. Although not shown in FIG. 18, the slave unit is thereby instructed to transmit a response according to a timing specified in this time domain. After these steps for the subscription process are completed, the program returns to Step 1101.

Figure 19:
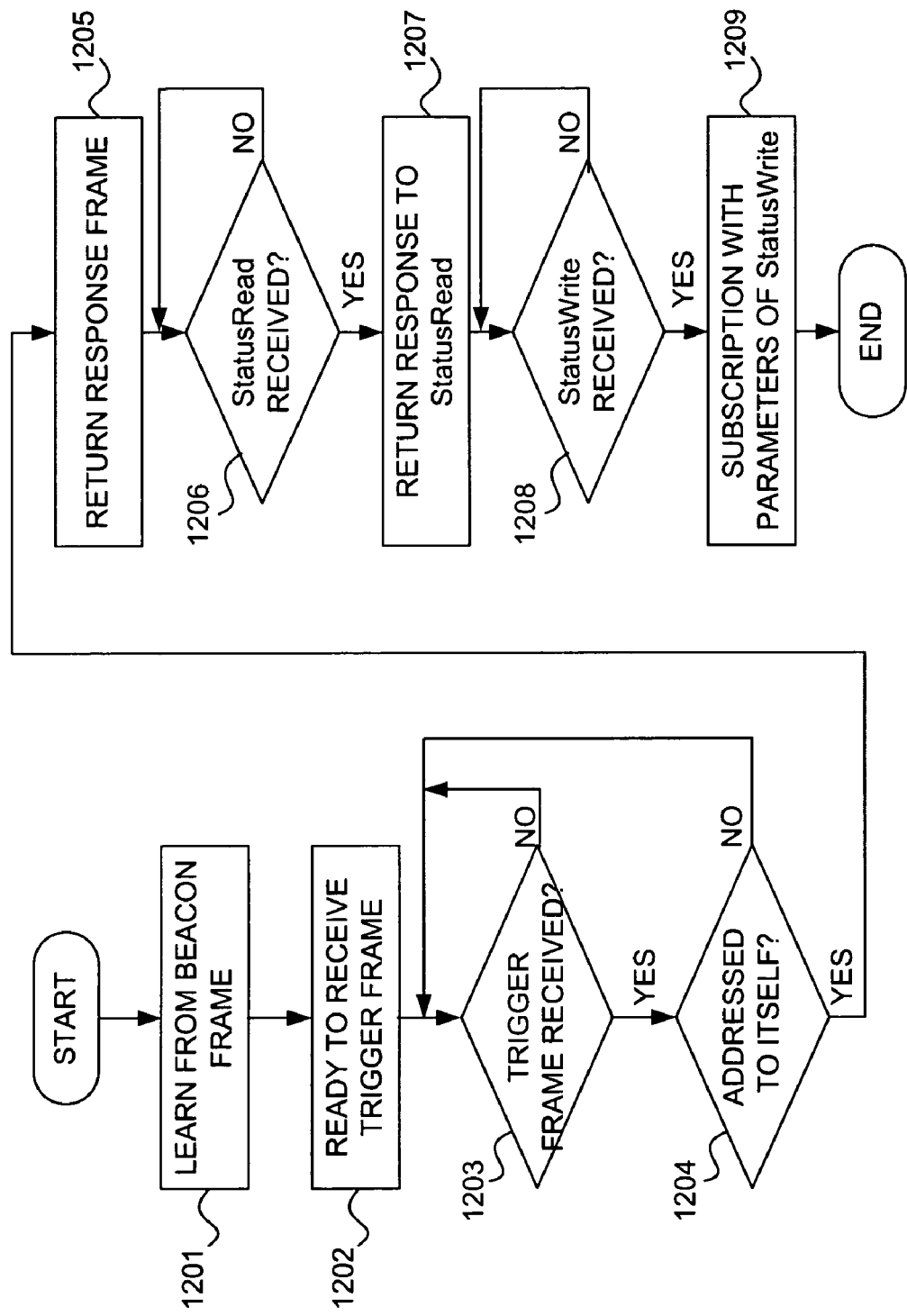
FIG. 19 is a flowchart of the operations of a slave unit.

Next, the operations by the slave unit are explained with reference to FIG. 19. After the frame transmission speed and the number of repeaters to be passed are learned by the method described above through the BF received from the master unit (Step 1201), the slave unit becomes ready to receive a trigger frame (Step 1202) and waits until a trigger frame is received (Step 1203). If a trigger frame is received from the master unit (YES in Step 1203), it is examined whether it is address to itself, or whether the slave unit is its addressee (Step 1204). If it is not addressed to itself (NO in Step 1204), the slave unit waits until the next trigger frame is received. If the received trigger frame is addressed to itself (YES in Step 1204), a response frame is returned to the master unit (Step 1205) and the slave unit waits for the arrival of StatusRead frame from the master unit (Step 1206). If StatusRead frame is received from the master unit (YES in Step 1206), the number of repeaters to itself is transmitted back to the master unit as response (Step 1207) and the slave unit waits for the arrival of StatusWrite frame from the master unit (Step 1208). If StatusWrite frame is received from the master unit (YES in Step 1208), the slave unit enters into a subscribed condition according to a parameter in StatusWrite and the time domain is reflected, or the slave unit sets itself for transmitting a response frame according to the response timing specified by the time domain (Step 1209).

Figure 20:
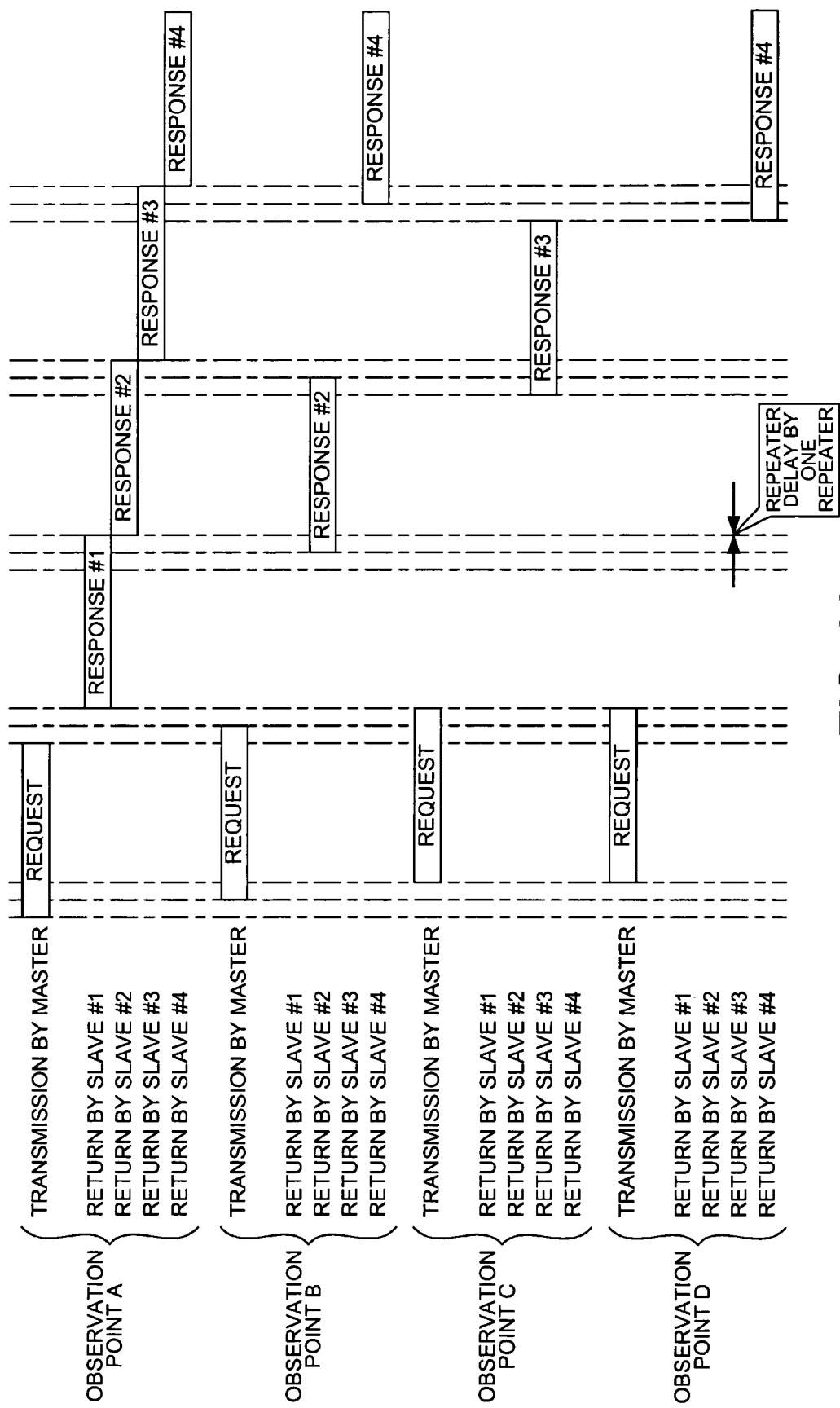
FIG. 20 shows the flow of request frames transmitted from the master unit and the response frames from the slave units of FIG. 17.
Figure 21:
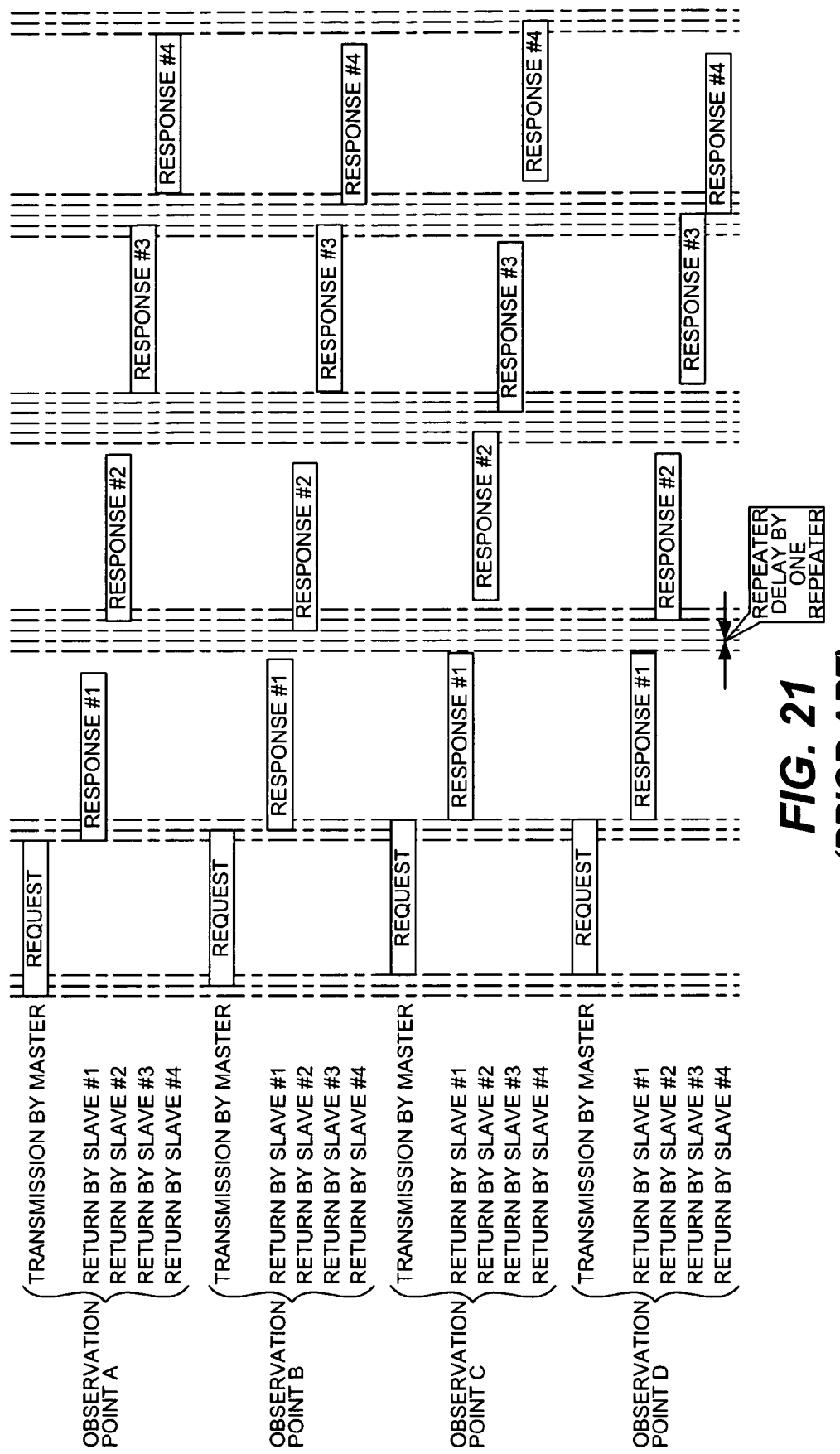
FIG. 21 shows the flow of request frames transmitted from the master unit and the response frames from the slave units of FIG. 17 according to a prior art technology.

FIG. 20 shows the flow of trigger frames transmitted from the master unit and the response frames from the slave units of FIG. 17 at the four observation points indicated by letters A, B, C and D. At Observation Point A, response frames from all slave units are observed in addition to the trigger frame from the master unit. At each of the other observation points (B, C and D), however, only the trigger frame from the master unit and the response frames from the slaves on the downstream side of that observation point are observed. This makes it clear that unnecessary repeat operations as shown by the corresponding diagram in FIG. 21 (showing a prior art technology) are not performed.

In this example, each repeater unit is set so as to repeat each response frame only from the downstream side to the upstream side and to make each response faster by the length of repeater delay according to the number of repeater units to be passed through such that the intervals between the response frames can be minimized at Observation Point A. With the setting thus made, the intervals for the responses can be minimized at Observation Point A and, as shown in FIG. 20, the repeater delay can be reduced for each response frame.

The response transmission timing at each slave unit may be expressed as follows: (Starting time of response frame transmission from the slave unit after trigger frame is received)=(Position of response frame of the slave unit at Observation Point A)−(Delay in arrival of trigger frame)−(Time for response frame of the slave unit to reach Observation Point A)=(Position of response frame of the slave unit at Observation Point A)−(Repeater delay)×(Twice the number of repeaters (number of repeater stages) to the slave unit).

The communication cycle in this situation is given as follows: (Communication cycle)=(Time length of trigger frame)+(Repeater delay)×(Maximum number of repeater stages)+(Time length of response frame)×(Number of slave units).

This shows that the communication cycle becomes reduced from the situation with prior art technology by (Repeater delay)×(Maximum number of repeater stages)×((Twice the number of repeaters)−1).

A comparison experiment was carried out by constructing a communication network by using a prior art technology and another communication network of the same structure by using the present invention. The cycle time by the former was 1.8 ms but it was reduced down to 1.2 ms by the latter.

In summary, the present invention serves to reduce the repeater delay which is generated every time a communication frame transmitted on a network passes through a repeater unit such that a communication network with improved communication cycle can be provided.

What is claimed is:

1. A communication system comprising:
a master unit which is a programmable controller having a communication function;
at least one slave unit which is an I/O terminal unit having a communication function and connected to said master unit by a network; and
repeater units inserted on said network between said master unit on their upper side and said at least one slave unit in one or more stages on their lower side;
wherein communication frames of various types are transmitted through said network, each of said communication frames containing identification data indicative of the type thereof;
wherein a type of a communication frame to be transmitted from said slave unit to said master unit contains identification data indicative of such the type of frame;
wherein said repeater units include an upper port connected to the upstream side of said network and a lower port connected to the downstream side of said network, and serve to repeat said communication frame only in a direction from said lower port to said upper port when it is determined that said communication frame received by said repeater units through said upper port or said lower port contains the identification data indicative of the type of frame to be transmitted from said slave unit to said master unit;
wherein said master unit serves to transmit a specific communication frame of said communication frames of various types and read out, from one of response frames received from said slave unit in response to said specific communication frame transmitted from said master unit, the number of stages of repeater units passed by the received response frames, to write information into said slave unit for setting a timing for returning the response frames from the slave unit to said master unit based on said number that has been read out;

wherein said timing is set for each slave unit to return response frames in response to a communication frame from said master unit such that said master unit receives said returned response frames with no space between said returned response frames regardless of repeater delay times of each of said returned response frames.

2. The communication system of claim 1, wherein a type of a communication frame to be transmitted from said master unit to said slave unit contains identification data indicative of such type of frame; and
wherein said repeater units repeat said communication frame only in a direction from said upper port to said lower port when it is determined that said communication frame received by said repeater units through said upper port or said lower port contains the identification data indicative of the type of frame to be transmitted from said master unit to said slave unit.

3. The communication system of claim 2, wherein a type of a communication frame to be transmitted in both directions between said master unit and said slave unit contains identification data indicative of such type of frame; and
wherein said repeater units repeat said communication frame in a direction from said upper port to said lower port when it is determined that said communication frame received by said repeater units through said upper port contains the identification data indicative of the type of frame to be transmitted in both direction between said master unit and said slave unit, and
said repeater units repeat said communication frame in a direction from said lower port to said upper port when it is determined that said communication frame received by said repeater units through said lower port contains the identification data indicative of the type of frame to be transmitted in both direction between said master unit and said slave unit.

4. The communication system of of claim 3,
wherein said slave unit stores the number of stages of said repeater units between said slave unit and said master unit.

5. The communication system of claim 4, wherein a type of a communication frame to be transmitted from said master unit to said slave unit contains identification data indicative of such type of frame; and
wherein said repeater units repeat said communication frame only in a direction from said upper port to said lower port when it is determined that said communication frame received by said repeater units through said upper port or said lower port contains the identification data indicative of the type of frame to be transmitted from said master unit to said slave unit.

6. The communication system of of claim 2,
wherein said slave unit stores the number of stages of said repeater units between said slave unit and said master unit.

7. The communication system of claim 6, wherein a type of a communication frame to be transmitted from said master unit to said slave unit contains identification data indicative of such type of frame; and
wherein said repeater units repeat said communication frame only in a direction from said upper port to said lower port when it is determined that said communication frame received by said repeater units through said upper port or said lower port contains the identification data indicative of the type of frame to be transmitted from said master unit to said slave unit.

8. The communication system of claim 1, wherein a type of a communication frame to be transmitted in both directions between said master unit and said slave unit contains identification data indicative of such type of frame; and
wherein said repeater units repeat said communication frame in a direction from said upper port to said lower port when it is determined that said communication frame received by said repeater units through said upper port contains the identification data indicative of the type of frame to be transmitted in both direction between said master unit and said slave unit, and
said repeater units repeat said communication frame in a direction from said lower port to said upper port when it is determined that said communication frame received by said repeater units through said lower port contains the identification data indicative of the type of frame to be transmitted in both direction between said master unit and said slave unit.

9. The communication system of of claim 8,
wherein said slave unit stores the number of stages of said repeater units between said slave unit and said master unit.

10. The communication system of claim 9, wherein a type of a communication frame to be transmitted from said master unit to said slave unit contains identification data indicative of such type of frame; and
wherein said repeater units repeat said communication frame only in a direction from said upper port to said lower port when it is determined that said communication frame received by said repeater units through said upper port or said lower port contains the identification data indicative of the type of frame to be transmitted from said master unit to said slave unit.

11. The communication system of claim 1, wherein said specific communication frame is adapted to contain data on address values of the repeater units that have been passed and data on the number of stages of the repeater units;
wherein said repeater units serve to cause said specific communication frames to contain data on the address value of said repeater unit and the value of one plus the number of stages of the repeater units when one of said specific communication frames passes through said repeater unit; and
wherein said slave unit serves to read out of said specific communication frame data on the address value of the repeater unit adjoining in the upstream direction and on the number of repeater units to cause said response frame to said master unit to contain data on the address value of the repeater unit adjoining in the upstream direction and the number of stages of the repeater units read out of said specific communication frame.

12. The communication system of claim 1 wherein said communication frames of various types include an "In-frame" for transmitting input data of said I/O terminal unit by said slave unit;
wherein the slave unit serves to return said In-frame based on said information on timing, faster by the length of repeater delay when said In-frame is sent by said slave unit; and
wherein said repeater units repeat said In-frame only in a direction of from said lower port to said upper port.

13. The communication system of claim 1 wherein said slave unit is adapted to transmit a connection frame for acknowledging existence of said slave unit to said master unit;
wherein said master unit serves to transmit a request frame for requesting said slave unit to transmit said connection frame;

wherein said communication frames include said connection frame and said request frame;

wherein said slave unit serves to return said connection frame based on said information on timing, faster by the length of repeater delay when said connection frame is sent by said slave unit; and wherein said repeater units repeat said connection frame only in a direction from said lower port to said upper port.

14. The communication system of claim 13, wherein a type of a communication frame to be transmitted in both directions between said master unit and said slave unit contains identification data indicative of such type of frame; and wherein said repeater units repeat said communication frame in a direction from said upper port to said lower port when it is determined that said communication frame received by said repeater units through said upper port contains the identification data indicative of the type of frame to be transmitted in both direction between said master unit and said slave unit, and said repeater units repeat said communication frame in a direction from said lower port to said upper port when it is determined that said communication frame received by said repeater units through said lower port contains the identification data indicative of the type of frame to be transmitted in both direction between said master unit and said slave unit.

15. The communication system of claim 1, wherein said slave unit stores the number of stages of said repeater units between said slave unit and said master unit.

16. The communication system of claim 15, wherein a type of a communication frame to be transmitted from said master unit to said slave unit contains identification data indicative of such type of frame; and wherein said repeater units repeat said communication frame only in a direction from said upper port to said lower port when it is determined that said communication frame received by said repeater units through said upper port or said lower port contains the identification data indicative of the type of frame to be transmitted from said master unit to said slave unit.

17. The communication system of claim 15, wherein a type of a communication frame to be transmitted in both directions between said master unit and said slave unit contains identification data indicative of such type of frame; and wherein said repeater units repeat said communication frame in a direction from said upper port to said lower port when it is determined that said communication frame received by said repeater units through said upper port contains the identification data indicative of the type of frame to be transmitted in both direction between said master unit and said slave unit, and said repeater units repeat said communication frame in a direction from said lower port to said upper port when it is determined that said communication frame received by said repeater units through said lower port contains the identification data indicative of the type of frame to be transmitted in both direction between said master unit and said slave unit.

18. The communication system of claim 15, wherein said master unit serves to transmit a request frame to the slave unit for requesting transmission of a connection frame for acknowledging existence of said slave unit;

wherein said slave unit serves to transmit said connection frame to said master unit based on said timing, faster by the length of repeater delay when said connection frame is sent by said slave unit; and wherein said repeater units repeat said connection frame only in a direction from said lower port to said upper port.

19. The communication system of claim 15, wherein said communication frames of various types include an "In-frame" for transmitting input data of said I/O terminal unit by said slave unit;

wherein the slave unit serves to return "In-frame" containing said input data of said I/O terminal such that said master unit receives said response frames with no space between said returned response frames regardless of repeater delay times of each of said returned response frames; and wherein said repeater units repeat said In-frame only in a direction from said lower port to said upper port.

* * * * *